(12) United States Patent
Ohyama et al.

(10) Patent No.: US 11,662,292 B2
(45) Date of Patent: May 30, 2023

(54) MEASUREMENT APPARATUS AND METHOD

(71) Applicant: Panasonic Intellectual Property Management Co., Ltd., Osaka (JP)

(72) Inventors: Tatsushi Ohyama, Osaka (JP); Mariko Miyashita, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 313 days.

(21) Appl. No.: 17/163,652

(22) Filed: Feb. 1, 2021

(65) Prior Publication Data

US 2021/0181081 A1    Jun. 17, 2021

Related U.S. Application Data

(63) Continuation of application No. PCT/JP2019/031100, filed on Aug. 7, 2019.

(30) Foreign Application Priority Data

Sep. 5, 2018 (JP) ............................. JP2018-165975
Jul. 29, 2019 (JP) ............................. JP2019-139109

(51) Int. Cl.
   *G01N 15/06* (2006.01)

(52) U.S. Cl.
   CPC ..... *G01N 15/06* (2013.01); *G01N 2015/0693* (2013.01)

(58) Field of Classification Search
   None
   See application file for complete search history.

(56) References Cited

U.S. PATENT DOCUMENTS

2004/0239913 A1* 12/2004 Kobayashi .............. G01W 1/00
                                                       356/4.01
2013/0286454 A1* 10/2013 Toyoda .................. G02B 26/06
                                                       359/199.1

FOREIGN PATENT DOCUMENTS

EP        1158283 A1 * 11/2001 ............... G01H 9/00
JP        59-094076      5/1984
                    (Continued)

OTHER PUBLICATIONS

International Search Report of PCT application No. PCT/JP2019/031100 dated Nov. 5, 2019.

*Primary Examiner* — Dominic J Bologna
(74) *Attorney, Agent, or Firm* — McDermott Will & Emery LLP

(57) ABSTRACT

A measurement apparatus includes a light source, an interferometer, a light receiver, and a signal processor. The light source emits laser light to a scatterer in the atmosphere. The laser light has multiple oscillation frequencies separated from each other at equal frequency intervals. The interferometer produces interference in scattered light generated as a result of the laser light being scattered by the scatterer. The light receiver receives Mie scattered light included in the scattered light subjected to the interference produced by the interferometer and generates a signal. The signal processor detects the quantity of the Mie scattered light based on the signal. Each of the equal frequency intervals is smaller than the full width at half maximum of the peak of a frequency spectrum of Rayleigh scattered light. The Rayleigh scattered light is generated as a result of the laser light being scattered by molecules forming the atmosphere.

12 Claims, 17 Drawing Sheets

(56) References Cited

FOREIGN PATENT DOCUMENTS

| | | |
|---|---|---|
| JP | 1-006728 | 1/1989 |
| JP | 3-144324 | 6/1991 |
| JP | 3-158726 | 7/1991 |
| JP | 11-289122 | 10/1999 |
| JP | 2000-510951 | 8/2000 |
| JP | 2006-133146 | 5/2006 |
| WO | 1997/044633 | 11/1997 |
| WO | 2003/073127 | 9/2003 |
| WO | 2016/208013 | 12/2016 |

* cited by examiner

MEASUREMENT APPARATUS AND METHOD

BACKGROUND

1. Technical Field

The present disclosure relates to a measurement apparatus and method for detecting the distribution of aerosols in the atmosphere, for example.

2. Description of the Related Art

A light detection and ranging (lidar) device using lidar technology is known as an example of a measurement apparatus. Lidar technology is the following technology. Short-pulse laser light is emitted to the atmosphere in an observation area, and light scattered by subjects within the observation area is received. A signal indicating the scattered light is measured and analyzed so that the state of subjects in the air, that is, the state of aerosols, such as yellow sand, pollen, dust, and miniscule droplets, is detected. Scattered light includes Mie scattered light components and Rayleigh scattered light components. Mie scattering is scattering of light by subjects to be measured, in other words, by particles of a size equal to or larger than the wavelength of laser light. Rayleigh scattering is scattering of light by fine particles of a size smaller than the wavelength of laser light. Separating Rayleigh scattered light components from scatted light can detect Mie scattered light components.

Separating Mie scattered light components generated by Mie scattering by aerosols and Rayleigh scattered light components generated by Rayleigh scattering by molecules in the atmosphere from each other with filters by using single-longitudinal-mode laser light is known. An example of such a separating method is disclosed in International Publication No. 2003/073127.

The full width at half maximum of the peak of Mie scattered light resulting from aerosols is substantially equal to that of emitted laser light. The full width at half maximum of the peak of Rayleigh scattered light resulting from molecules in the atmosphere is wider because of the Doppler effect by thermal motion. The method disclosed in the above-described publication is that for separating Mie scattered light and Rayleigh scattered light from each other by utilizing the difference between these two full widths at half maximum.

In this method, however, it is necessary to narrow the laser band and also adjust the laser wavelength to the absorption spectrum or the bandpass spectrum of a spectroscope. This strenuous control may make it difficult to perform continuous measurements for a long period by using the method disclosed in this publication.

Detecting scattered light from multiple wavelength spectra and separating Mie scattered light components resulting from aerosols and Rayleigh scattered light components resulting from molecules in the atmosphere from each other from the scattered light by using multi-longitudinal-mode laser light is known. An example of such a separating method is disclosed in Japanese Patent No. 6243088.

In the technology disclosed in this publication, by utilizing the characteristics in which the spectrum mode interval of multi-longitudinal-mode laser light is uniform, light components having the same spectrum mode interval as the multi-longitudinal-mode laser light are caused to pass through an interferometer. In contrast, the spectrum of Rayleigh scattered light components has a shape so as to interpolate the spectrum mode intervals of the multi-longitudinal-mode laser light. In this manner, in the technology disclosed in this publication, a Rayleigh scattered signal is detected by removing Mie scattered light components with the interferometer.

SUMMARY

In one general aspect, the techniques disclosed here feature a measurement apparatus including a light source, an interferometer, a light receiver, and a signal processor. The light source emits laser light to a scatterer in the atmosphere. The laser light has a plurality of oscillation frequencies separated from each other at equal frequency intervals. The interferometer produces interference in scattered light generated as a result of the laser light being scattered by the scatterer. The light receiver receives Mie scattered light included in the scattered light subjected to the interference produced by the interferometer and generates a signal. The signal processor detects the quantity of the Mie scattered light based on the signal. Each of the equal frequency intervals is smaller than the full width at half maximum of the peak of a frequency spectrum of Rayleigh scattered light. The Rayleigh scattered light is generated as a result of the laser light being scattered by molecules forming the atmosphere.

It should be noted that general or specific embodiments may be implemented as a program that causes a computer to execute a measurement method described below or as a non-transitory computer-readable recording medium storing the program; a system, an integrated circuit, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION (Overview of the Disclosure)

Figure 1:
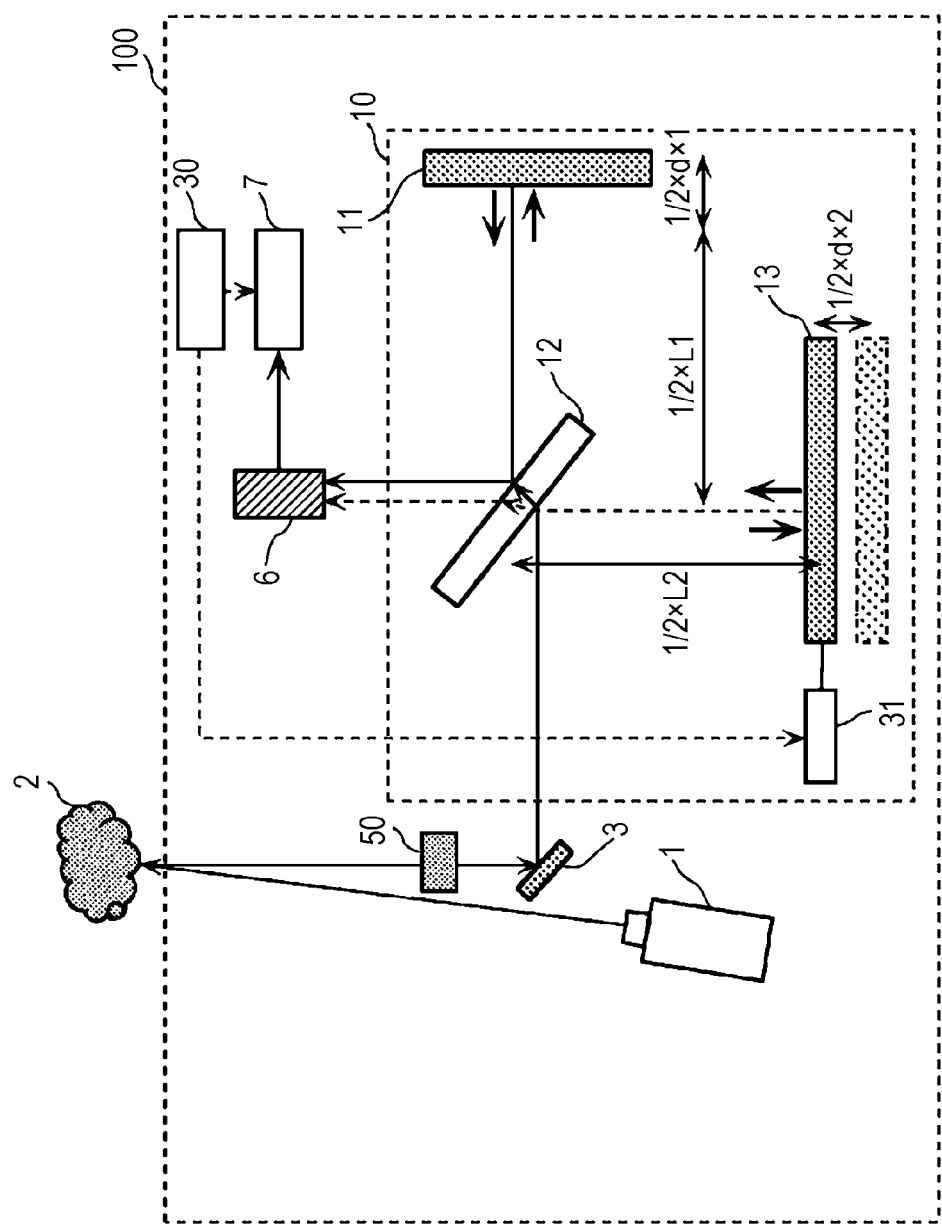
FIG. 1 is a schematic view illustrating the configuration of a measurement apparatus according to an embodiment of the disclosure.

A measurement apparatus and a measurement method according to aspects of the present disclosure are as follows.

A measurement apparatus according to an aspect of the disclosure includes a light source, an interferometer, a light receiver, and a signal processor. The light source emits laser light to a scatterer in the atmosphere. The laser light has oscillation frequencies separated from each other at equal frequency intervals. The interferometer produces interference in scattered light generated as a result of the laser light being scattered by the scatterer. The light receiver receives Mie scattered light included in the scattered light subjected to the interference produced by the interferometer and generates a signal. The signal processor detects the quantity of the Mie scattered light based on the signal. Each of the frequency intervals is smaller than the full width at half maximum of the peak of a frequency spectrum of Rayleigh scattered light. The Rayleigh scattered light is generated as a result of the laser light being scattered by molecules forming the atmosphere.

With this configuration, the difference between the frequency spectrum of Rayleigh scattered light resulting from molecules forming the atmosphere and that of Mie scattered light resulting from aerosols can be utilized. It is thus possible to separate and detect Mie scattered light with a simple method without the need to synchronize the wavelength of multi-laser light and the spectrum of a spectroscope, such as the interferometer, with each other.

In the measurement apparatus according to an aspect, the interferometer may split the scattered light into first scattered light and second scattered light, the optical path of the second scattered light being different from that of the first scattered light, vary an optical path difference between the optical path of the first scattered light and that of the second scattered light, and cause the first scattered light and the second scattered light to interfere with each other so as to generate interference light.

With this configuration, the difference between the frequency spectrum of Rayleigh scattered light resulting from molecules forming the atmosphere and that of Mie scattered light resulting from aerosols can be utilized. It is thus possible to separate and detect Mie scattered light with a simple method without the need to synchronize the wavelength of multi-laser light and the spectrum of a spectroscope, such as the interferometer, with each other.

In the measurement apparatus according to an aspect, each of the equal frequency intervals may be equal to or lower than 3.9 GHz.

This makes it possible to detect Mie scattered light components included in the scattered light with high precision.

A measurement apparatus according to another aspect of the disclosure includes a light source, an interferometer, a light receiver, a signal processor, and a controller. The light source emits laser light to a scatterer in the atmosphere. The laser light has oscillation frequencies separated from each other at equal frequency intervals. The interferometer generates an interferogram by splitting scattered light generated as a result of the laser light being scattered by the scatterer into first scattered light and second scattered light and by causing the first scattered light and the second scattered light to interfere with each other. The optical path of the second scattered light is different from that of the first scattered light. The light receiver converts the interferogram into a signal. The signal processor processes the signal generated by the light receiver. The controller causes the interferometer to sweep an optical path difference between the optical path of the first scattered light and that of the second scattered light. The signal processor acquires a signal component corresponding to Mie scattered light included in the scattered light, by extracting a signal component including a first interference fringe from a signal component of the interferogram. The first interference fringe is generated when the optical path difference is equal to a wavelength interval corresponding to each of the equal frequency intervals.

With this configuration, the difference between the frequency spectrum of Rayleigh scattered light resulting from molecules forming the atmosphere and that of Mie scattered light resulting from aerosols can be utilized. It is thus possible to separate and detect Mie scattered light with a simple method without the need to synchronize the wavelength of multi-laser light and the spectrum of a spectroscope, such as the interferometer, with each other.

In the measurement apparatus according to an aspect, the interferogram may include interference fringes. The controller may cause the interferometer to sweep the optical path difference in a range which is greater than ¼ of a center wavelength of the laser light and which is smaller than ½ of an interval between the interference fringes.

This makes it possible to detect Mie scattered light components included in the scattered light with high precision.

In the measurement apparatus according to an aspect, the signal processor may execute Fourier transform on the signal component including the first interference fringe.

This makes it possible to uniquely determine the strength of a received signal and to detect aerosols with high precision based on the strength of Mie scattered light.

In the measurement apparatus according to an aspect, the interferometer may include first and second movable mirrors.

This makes it possible to vary the optical path difference between two scattered light beams split from scattered light with a simple configuration.

In the measurement apparatus according to an aspect, the frequency interval between the oscillation frequencies of the laser light may be equal to or lower than 5 GHz.

This can effectively remove Rayleigh scattered light included in scattered light, thereby detecting Mie scattered light components with high precision.

The measurement apparatus according to an aspect, the frequency interval between the oscillation frequencies of the laser light may be equal to or lower than 3.9 GHz.

This makes it possible to detect Mie scattered light components included in scattered light with even higher precision.

The measurement apparatus according to an aspect may further include a condenser that is disposed on the optical path between the scatterer and the interferometer and condenses the scattered light.

With this configuration, even if the strength of scattered light is weak, Mie scattered light can be separated and detected with high precision as a result of the condenser condensing the scattered light.

A measurement method according to another aspect of the disclosure includes: emitting laser light to a scatterer in the atmosphere, the laser light having oscillation frequencies separated from each other at equal frequency intervals; producing interference in scattered light, the scattered light being generated as a result of the laser light being scattered by the scatterer; receiving Mie scattered light included in the scattered light subjected to the interference and generating a signal; and detecting the quantity of the Mie scattered light from the signal. Each of the equal frequency intervals is smaller than the full width at half maximum of the peak of a frequency spectrum of Rayleigh scattered light. The Rayleigh scattered light is generated as a result of the laser light being scattered by molecules forming the atmosphere.

With this configuration, the difference between the frequency spectrum of Rayleigh scattered light resulting from molecules forming the atmosphere and that of Mie scattered light resulting from aerosols can be utilized. It is thus possible to separate and detect Mie scattered light with a simple method without the need to synchronize the wavelength of multi-laser light and the spectrum of a spectroscope, such as the interferometer, with each other.

A measurement method according to another aspect of the disclosure includes: emitting laser light to a scatterer in the atmosphere, the laser light having oscillation frequencies separated from each other at equal frequency intervals; generating an interferogram by splitting scattered light, the scattered light being generated as a result of the laser light being scattered by the scatterer, into first scattered light and second scattered light and by causing the first scattered light and the second scattered light to interfere with each other, an optical path of the second scattered light being different from that of the first scattered light; converting the interferogram into a signal; processing the signal; and sweeping an optical path difference between the optical path of the first scattered light and that of the second scattered light. In the processing of the signal, a signal component corresponding to Mie scattered light included in the scattered light are acquired by extracting a signal component including a first interference fringe from a signal component of the interferogram. The first interference fringe is generated when the optical path difference is equal to a wavelength interval corresponding to each of the equal frequency intervals.

With this configuration, the difference between the frequency spectrum of Rayleigh scattered light resulting from molecules forming the atmosphere and that of Mie scattered light resulting from aerosols can be utilized. It is thus possible to separate and detect Mie scattered light with a simple method without the need to synchronize the wavelength of multi-laser light and the spectrum of a spectroscope, such as the interferometer, with each other.

In the measurement method according to another aspect of the disclosure, the interferometer may sweep the optical path difference in a range which is greater than ¼ of a center wavelength of the laser light and which is smaller than ½ of an interval $\Delta x$ between the interference fringes. An aspect of the disclosure may be implemented as a program that causes a computer to execute at least one of the above-described measurement methods. An aspect of the disclosure may be implemented as a non-transitory computer-readable recording medium storing the program.

In the present disclosure, some or all of the circuits, units, apparatuses, devices, members, or sections and/or some or all of the functional blocks in the block diagrams may be implemented by one or plural electronic circuits including a semiconductor device, a semiconductor integrated circuit (IC), or a large scale integration (LSI) circuit. An LSI or an IC may be integrated into one chip or be distributed over multiple chips. For example, the functional blocks other than storage elements may be integrated into one chip. An LSI or an IC may be called a system LSI, a very large scale integration (VLSI) circuit, or an ultra large scale integration (VLSI) circuit, depending on the integration degree. Instead of an LSI or an IC, a field programmable gate array (FPGA) that is programmable after it is manufactured, or a reconfigurable logic device that may reconfigure connections or settings of circuit cells within this device may be used for the same purpose.

The functions or operations of some or all of the circuits, units, apparatuses, devices, members, or sections may be executed by software. In this case, software is recorded on one or plural non-transitory recording media, such as read only memories (ROMs), optical discs, and hard disks. When software is executed by a processor, the functions specified by this software are executed by the processor and a peripheral device. The system, the apparatus, or the device may include one or plural non-transitory recording media having software recorded thereon, a processor, and a desirable hardware device, such as an interface.

An embodiment will be specifically described below with reference to the accompanying drawings. The embodiment described below illustrates a general or specific example. The numeric values, configurations, materials, elements, positions and connection states of the elements, steps, and the order of steps illustrated in the following embodiment are only examples, and are not described for limiting the disclosure. Among the elements illustrated in the following embodiment, the elements that are not recited in the independent claims which embody the broadest concept of the disclosure will be described as optional components.

In the drawings, the elements are only schematically illustrated and are not necessarily illustrated precisely. For example, the reduced scales in the individual drawings do not necessarily match each other. The substantially same elements are designated by like reference numeral, and the same explanation thereof will be simplified or omitted from the second time.

Embodiment

[1. Overview]

A measurement apparatus 100 according to an embodiment will first be described below with reference to FIG. 1. FIG. 1 illustrates the schematic configuration of the measurement apparatus 100.

The measurement apparatus 100 emits laser light to a space toward a predetermined direction and receives backscattered light generated as a result of the laser light being reflected by a subject 2 to be detected by the measurement apparatus 100. The measurement apparatus 100 then executes optical processing and numerical processing on the received light so as to reduce noise, and then detects the density of aerosols and the distribution of aerosols in the space.

As shown in FIG. 1, the measurement apparatus 100 includes a multi-laser light source 1, a mirror 3, a condenser 50, an interferometer 10, a light receiver 6, and a signal processor 7. The interferometer 10 includes a first movable mirror 11, a semitransparent mirror 12, and a second movable mirror 13.

In the interferometer 10, the semitransparent mirror 12 splits scattered light into two light beams which pass through different optical paths. The difference in the two optical paths of the split light beams (hereinafter called the optical path difference) is generated by the first and second movable mirrors 11 and 13 included in the interferometer 10.

A subject to be detected by the measurement apparatus 100 and a space, which is a detection area of the measurement apparatus 100, will be explained below.

A space, which is a detection area of the measurement apparatus 100 (hereinafter simply called a space), is a room in a building, such as a house, an office, a nursing facility, and a hospital, for example. The space is a closed space surrounded by walls, windows, door, floor, and ceiling, for example. However, the space is not restricted to a closed space. The space may alternatively be an open space outdoors or an inner space in a moving body, such as a bus or an airplane.

The subject 2 to be detected by the measurement apparatus 100 exists in a space. An example of the subject 2 is aerosols, Specific examples of aerosols are airborne dust particles, suspended particulate matter, such as $PM_{2.5}$, biological particles, such as pollen, and miniscule droplets. Biological particles also include airborne mold and mites. Other examples, such as matter and miniscule droplets generated from human bodies by coughing and sneezing, for example, may be included in the subject 2.

[2. Operation]

An example of measurement processing executed by the measurement apparatus 100 will be described below with reference to FIG. 2A.

Figure 2A:
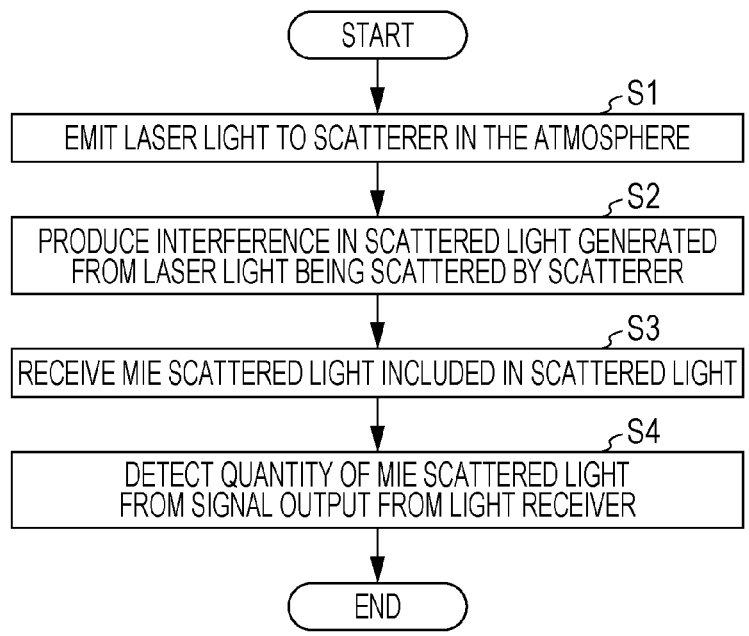
FIG. 2A is a flowchart illustrating an example of measurement processing according to the embodiment.

FIG. 2A is a flowchart illustrating an example of measurement processing according to the embodiment. In step S1, the multi-laser light source 1 emits laser light to a scatterer in the atmosphere. The scatterer is an example of the subject 2. In step S2, the interferometer 10 produces interference in scattered light generated as a result of the laser light being scattered by the scatterer. Then, in step S3, Mie scattered light included in the scattered light subjected to interference produced by the interferometer 10 is received by the light receiver 6. The light receiver 6 outputs a signal corresponding to the intensity of Mie scattered light. In step 34, the signal processor 7 detects the quantity of Mie scattered light from the signal output from the light receiver 6.

A more specific operation of measurement processing executed by the measurement apparatus 100 will be discussed below with reference to FIG. 2B.

Figure 2B:
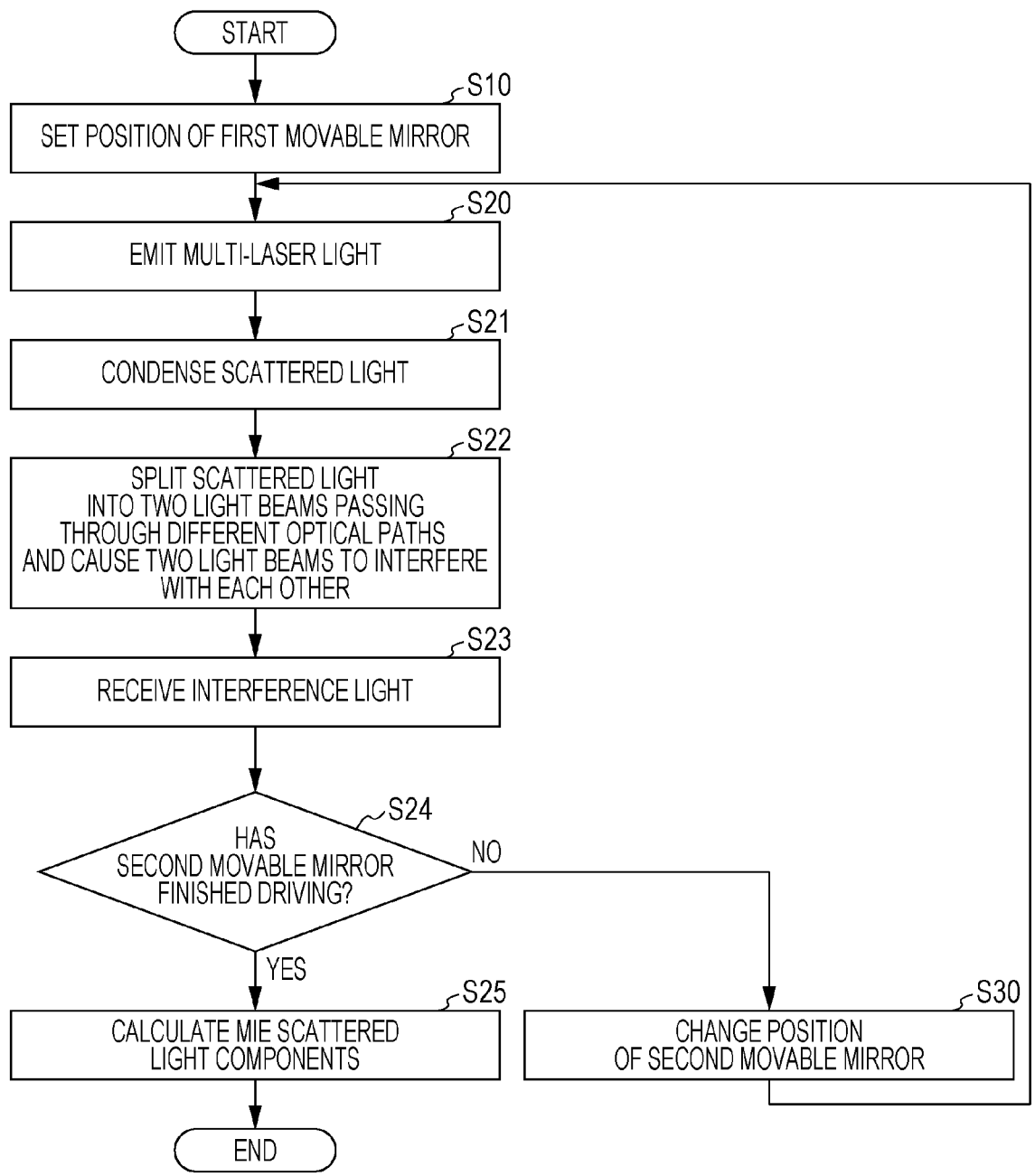
FIG. 2B is a flowchart illustrating another example of measurement processing according to the embodiment.

FIG. 2B is a flowchart illustrating another example of measurement processing according to the embodiment. In step S10, the position of the first movable mirror 11 is set. More specifically, the first movable mirror 11 is located at a predetermined position. Then, in step S20, the multi-laser light source 1 emits multi-laser light having a mode interval LW2. The mode interval LW2 corresponds to the frequency interval between multiple peaks of the multi-laser light, that is, the frequency interval of multiple oscillation frequencies of multi-laser light. The emitted laser light is scattered by the subject 2. The resulting scattered light includes light scattered by the subject 2 and that scattered by molecules in the atmosphere. In step S21, the scattered light is condensed by the condenser 50, such as a lens. As shown in FIG. 1, the condenser 50 is disposed between the subject 2 and the mirror 3. The condenser 50 may alternatively be disposed between the mirror 3 and the semitransparent mirror 12.

In step S22, in the interferometer 10, the condensed scattered light is split into two light beams passing through different optical paths, and the two light beams are caused to interfere with each other. More specifically, the semitransparent mirror 12 splits the condensed scattered light into first scattered light and second scattered light. The optical path of the first scattered light and that of the second scattered light are different from each other. The first scattered light is reflected by the first movable mirror 11 and returns to the semitransparent mirror 12 as first reflected light. The second scattered light is reflected by the second movable mirror 13 and returns to the semitransparent mirror 12 as second reflected light. The interferometer 10 generates interference light by causing the first reflected light output from the first movable mirror 11 and the second reflected light output from the second movable mirror 13 to interfere with each other.

In step 323, the generated interference light is received by the light receiver 6. The light receiver 6 generates a signal indicating the interference light (interferogram) and sends it to the signal processor 7. The signal processor 7 checks the amount by which the second movable mirror 13 has driven (hereinafter called the drive amount of the second movable mirror 13). More specifically, it is judged in step S24 whether the drive amount of the second movable mirror 13 reaches a predetermined value, that is, whether the second movable mirror 13 has finished driving. If the result of step S24 is YES, the process proceeds to step 325. If it is found in step S24 that the second movable mirror 13 has not yet finished driving (the result of step S24 is NO), a controller 30 changes the position of the second movable mirror 13 in step 330. More specifically, the controller 30 causes an actuator 31 to move the second movable mirror 13 by a predetermined amount. The process then returns to step S20.

If the second movable mirror 13 has finished driving (the result of step S24 is YES), the signal processor 7 receives the signal representing the interferogram from the light receiver 6. The interferogram is interference fringes generated as a result of two light beams passing through two optical paths interfering with each other due to the optical path difference. In step 325, the signal processor 7 calculates Mie scattered light components by using the signal representing the interferogram.

The drive amount of the second movable mirror 13 will be explained below with reference to FIG. 1. The drive amount corresponds to a distance dx2 by which the second movable mirror 13 travels.

The optical path L2 is that of the second scattered light. Specifically, the optical path L2 is twice as long as the distance between the semitransparent mirror 12 and the second movable mirror 13. The optical path L1 is that of the first scattered light. Specifically, the optical path L1 is twice as long as the distance between the semitransparent mirror 12 and the first movable mirror 11.

The light receiver 6 receives both of the first scattered light passing through the optical path L1 and the second scattered light passing through the optical path L2. When the second movable mirror 13 is moved, the optical path L2 changes, and the light receiver 6 can receive the scattered light generated due to the optical path difference between the optical path L1 and the optical path L2. The actuator 31, which is connected to the second movable mirror 13, moves (sweeps, more specifically) the second movable mirror 13. The controller 30 causes the actuator 31 to move so as to sweep the optical path difference, thereby generating an interferogram. The light receiver 6 converts the generated interferogram into a signal and outputs the signal to the signal processor 7.

From the signal components of the interferogram generated as a result of sweeping the optical path difference, the signal processor 7 extracts signal components in the vicinity of first interference fringes corresponding to the wavelength interval of laser light emitted from the multi-laser light source 1. The signal processor 7 then detects signal components corresponding to Mie scattered light by using the extracted signal components.

Although the controller 30 and the signal processor 7 are separately provided in the embodiment, they may be integrated into an electronic circuit, such as a single LSI.

In the generated interference fringes, Mie scattered light components are enhanced, while Rayleigh scattered light components are removed. It is thus possible to detect only Mie scattered light components with high precision.

This will be discussed below in detail.

Figure 3A:
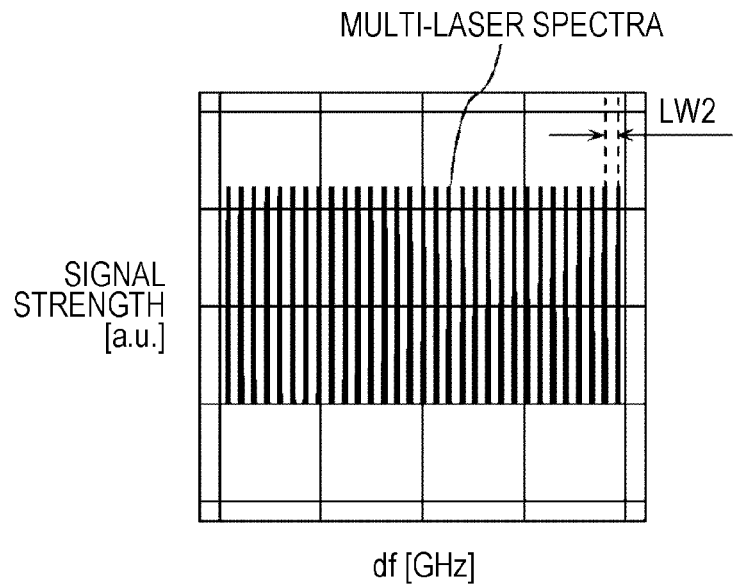
FIG. 3A is a graph illustrating an example of multi-laser light spectra according to the embodiment.
Figure 3B:
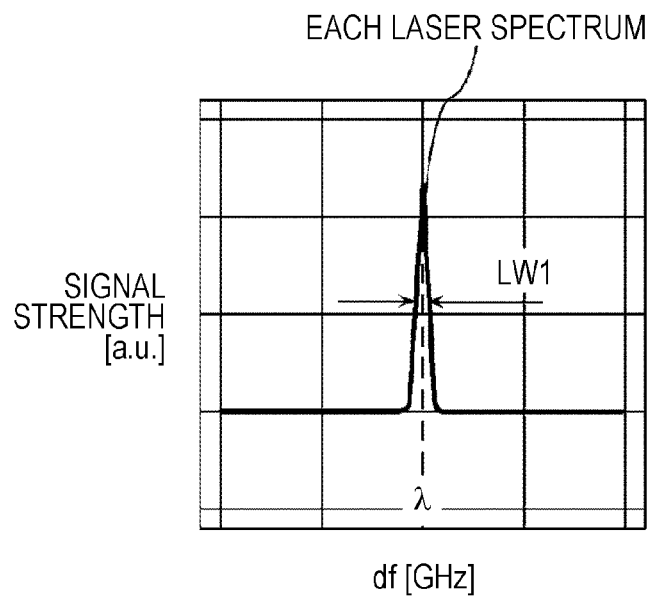
FIG. 3B is an enlarged graph illustrating a portion of the multi-laser light spectra shown in FIG. 3A.

FIG. 3A is a graph illustrating an example of multi-laser light spectra according to the embodiment. FIG. 3B is an enlarged graph illustrating each spectrum of the multi-laser light spectra shown in FIG. 3A. In FIGS. 3A and 3B, the horizontal axis indicates the spectrum difference, and the vertical axis indicates the signal strength of each spectrum of laser light. In FIG. 3A, the center value λ of the multiple wavelength spectra of multi-laser light is 400 nm, for example, and the mode interval LW2 is 6 GHz, for example. The mode interval LW2 is the frequency interval between multiple peaks of the multi-laser light. The mode interval LW2 is also called the spectrum interval LW2, FIG. 3B is an enlarged graph illustrating one of the multiple peaks included in multi-laser light shown in FIG. 3A. The full width at half maximum LW1 of one peak of multi-laser light is 360 MHz, for example. The multi-laser light source 1 emits multi-laser light including forty-one peaks having a full width at half maximum LW1 of 360 MHz, for example.

Figure 6:
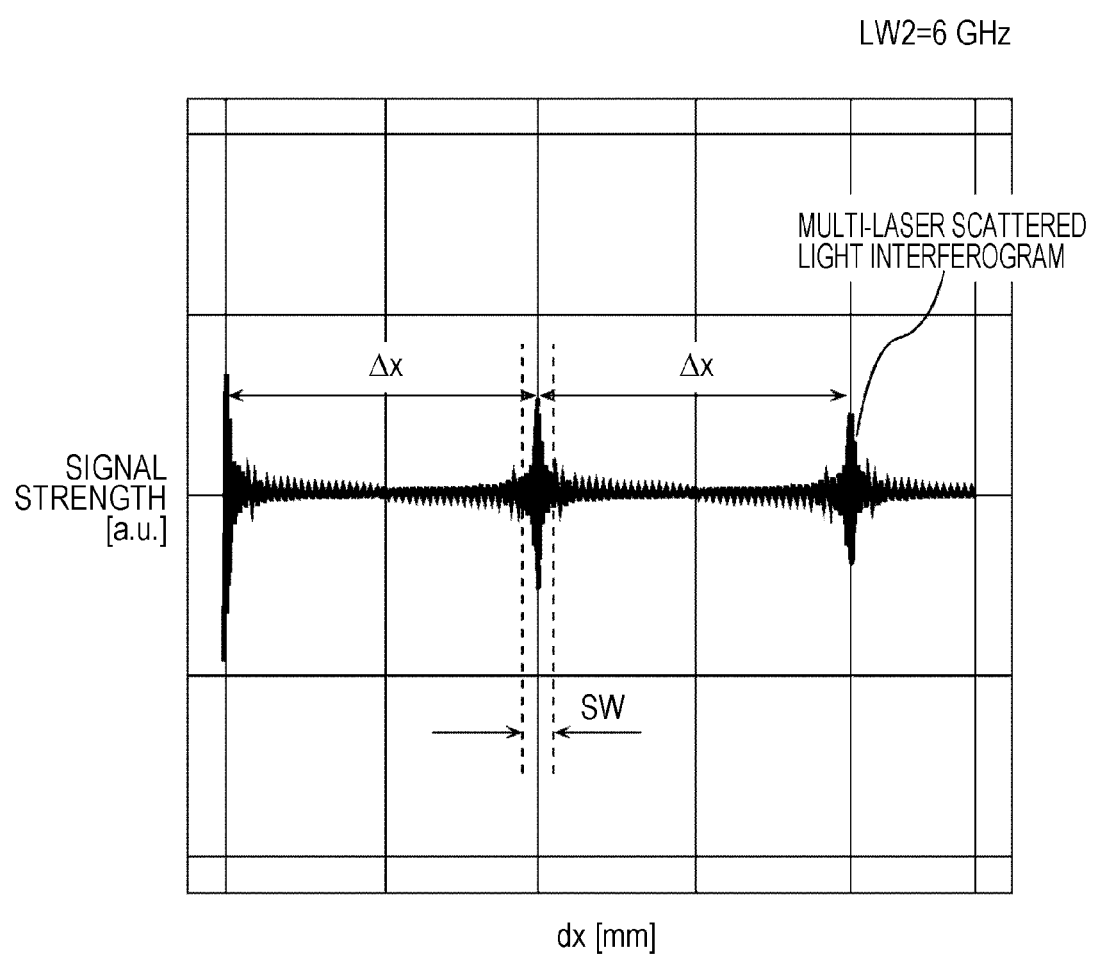
FIG. 6 is an enlarged graph illustrating a portion in FIG. 5.

Typically, when the difference between two wave surfaces is measured with the interferometer 10, interference fringes are generated as the difference between the wavelengths of the two wave surfaces. Regarding multi-laser light, an interferogram representing interference fringes corresponding to the mode interval LW2 of multi-laser light is generated. As shown in FIG. 6, the interference fringe interval Δx is found by the following equation (1):

$$\Delta x = C/LW2 \qquad (1)$$

where C is the speed of light ($3 \times 10^8$ m/s).

When the center value λ of the multiple wavelength spectra is 400 nm and the spectrum interval LW2 is 6 GHz, the interference fringe interval Δx can be calculated to be 50 mm from equation (1).

When the center value λ of the multiple wavelength spectra is 400 nm and the spectrum interval LW2 is 3 GHz, the interference fringe interval Δx can be calculated to be 100 mm from equation (1).

Figure 4A:
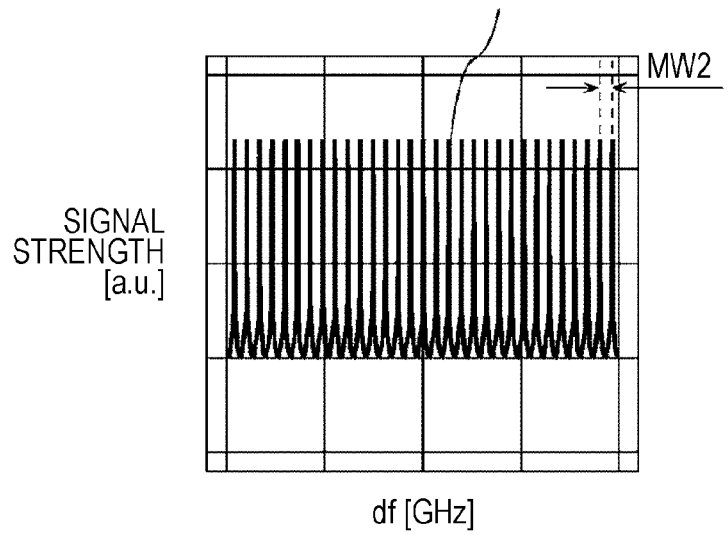
FIG. 4A is a graph illustrating an example of scattered light spectra according to the embodiment.
Figure 4B:
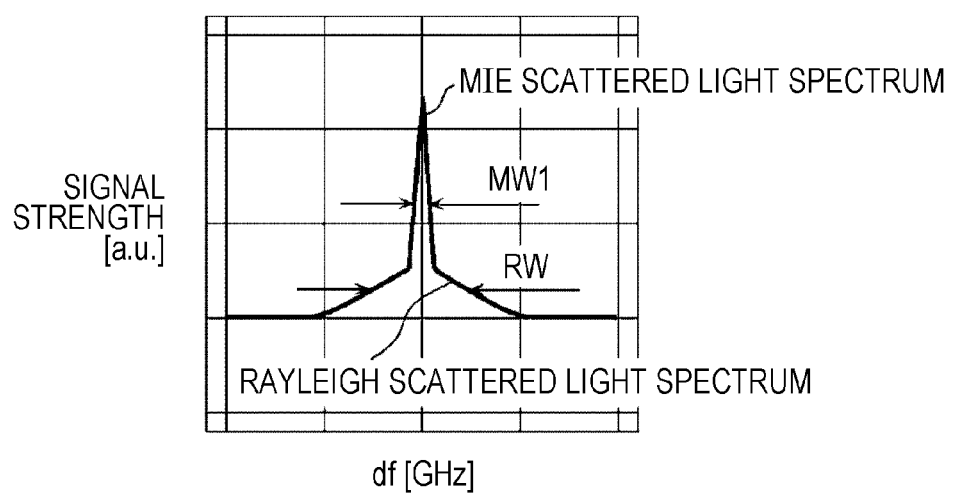
FIG. 4B is an enlarged graph illustrating a portion of the scattered light spectra in FIG. 4A.

FIG. 4A is a graph illustrating an example of scattered light spectra generated as a result of multi-laser light being scattered by the atmosphere and by aerosols according to the embodiment. FIG. 4B is an enlarged graph illustrating a portion of the scattered light spectra in FIG. 4A. In FIGS. 4A and 4B, the horizontal axis indicates the spectrum difference, and the vertical axis indicates the signal strength of each spectrum of the scattered light. The spectra of scattered light shown in FIGS. 4A through 6 are calculated by setting the intensity Im of scattered light resulting from the atmosphere and the intensity I of scattered light resulting from aerosols to be 3:1. The spectrum interval MW2 of scattered light is equal to the mode interval LW2 of multi-laser light. The full width at half maximum MW1 of the peak of the frequency spectra of Mie scattered light due to aerosols is equal to the full width at half maximum LW1 of that of multi-laser light.

The full width at half maximum RW of the peak of the frequency spectra of Rayleigh scattered light resulting from molecules in the atmosphere becomes wide due to thermal motion. It is known that the full width at half maximum RW of Rayleigh scattered light is about 3.4 to 3.9 GHz. Based on this value range, the full width at half maximum RW is set to be 3.6 GHz (1.9 pm).

One aspect of the present disclosure provides a technique of extracting an aerosol signal based on the difference between the two full widths at half maximum MW1 and RW.

Figure 5:
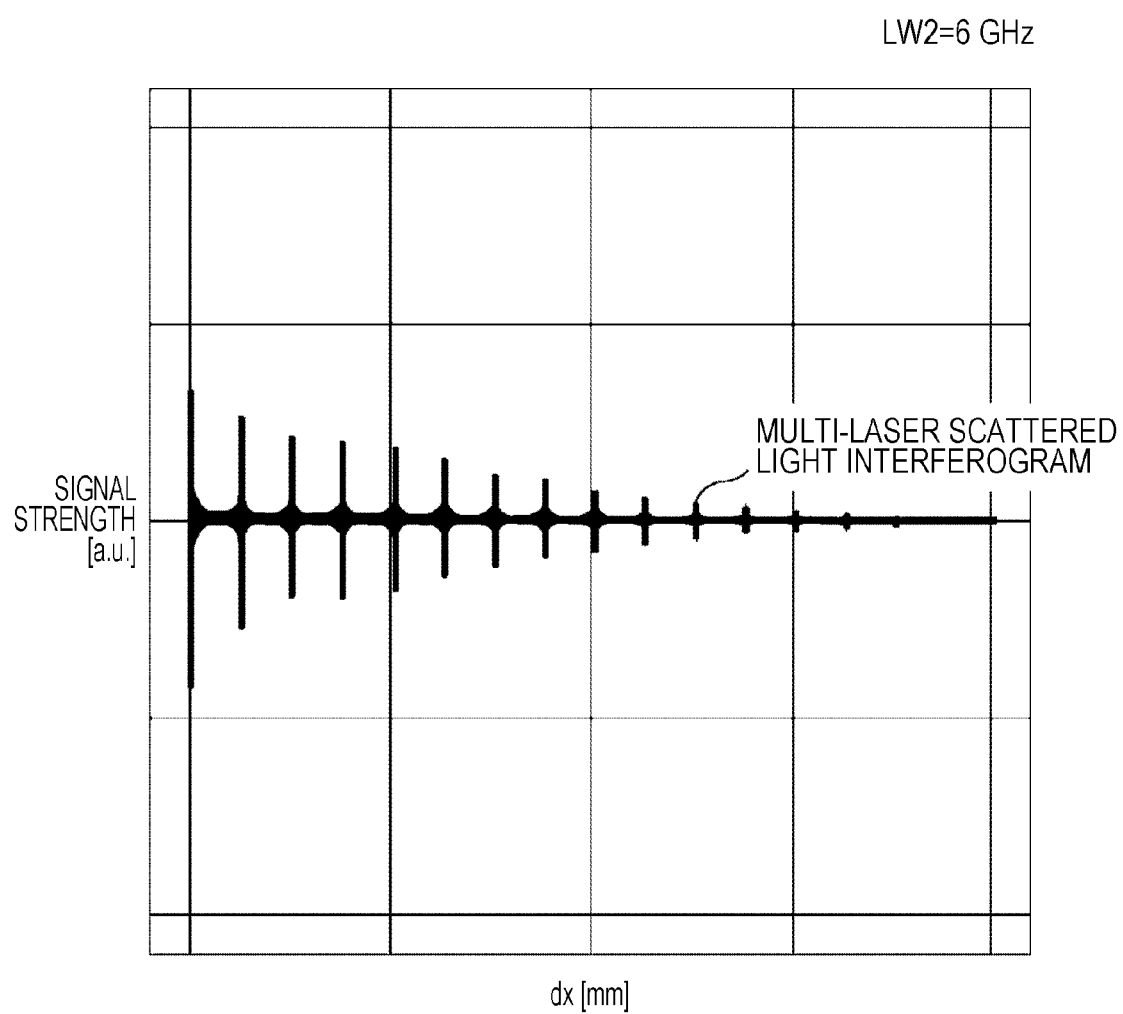
FIG. 5 is a graph illustrating an example of the calculation results of an interferogram formed from multi-laser scattered light spectra generated in the interferometer.

FIG. 5 is a graph illustrating an example of the calculation results of an interferogram formed from multi-laser scattered light spectra generated in the interferometer 10. The horizontal axis indicates the optical path difference dx in the interferometer 10, and the vertical axis indicates the strength of a signal output from the interferometer 10. The signal strength is calculated by setting the spectrum interval LW2 to be 6 GHz. Considering the spectrum interval LW2 in terms of the wavelength interval, the wavelength interval is calculated to be 3.2 pm.

FIG. 6 is an enlarged graph illustrating a portion in FIG. 5, In FIG. 6, the horizontal axis indicates the optical path difference dx in the interferometer 10, and the vertical axis indicates the strength of a signal output from the interferometer 10.

It is defined that the interference fringe when dx=0 is a 0th interference fringe, the interference fringe when dx=Δx is a first interference fringe, and the interference fringe when dx=n×Δx is an n-th interference fringe. In an aspect of the disclosure, as a result of sweeping the second movable mirror 13 in the interferometer 10, signal components in the vicinity of the first interference fringes corresponding to the wavelength interval are detected so that only Mie scattered light components can be obtained, while Rayleigh scattered light components are removed.

Measurements are conducted under the following conditions, for example. Regarding the position (½×dx1) of the first movable mirror 11, dx1 is set to be 50 mm. Regarding the position (½×dx2) of the second movable mirror 13, dx2 is varied between −0.1 mm, 0 mm, and 0.1 mm. That is, the number N of measurement portions is set to be 3. Under these conditions, an interferogram is generated. The measurement range sx can be expressed as follows.

Measurement range $sx=0.1\times(N-1)$

The measurement range sx is set to be greater than ¼ of the center wavelength λ of multi-laser light and is smaller than ½ of the interference fringe interval Δx.

FIGS. 7A through 7D are graphs illustrating examples of the calculation results regarding the dependency of interferograms formed from multi-laser scattered light spectra generated in the interferometer 10 on the intensity I of scattered light resulting from aerosols.

Figure 7A:
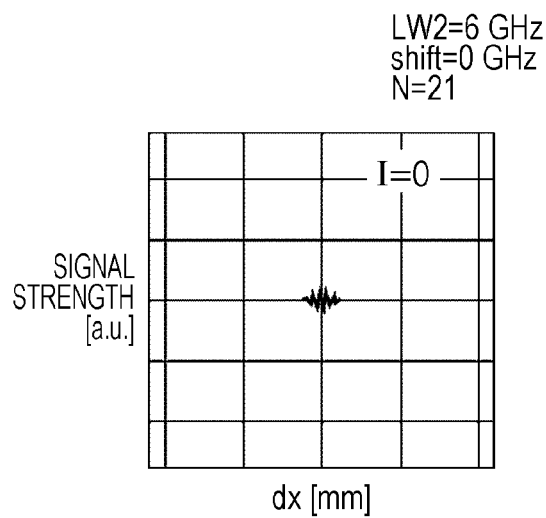
FIGS. 7A through 7D are graphs illustrating examples of the calculation results regarding the dependency of interferograms generated by the measurement apparatus of the embodiment on the intensity I of scattered light due to aerosols.
Figure 7B:
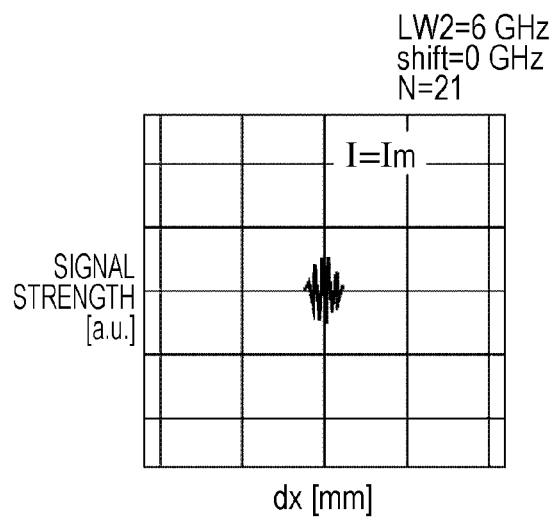
Figure 7C:
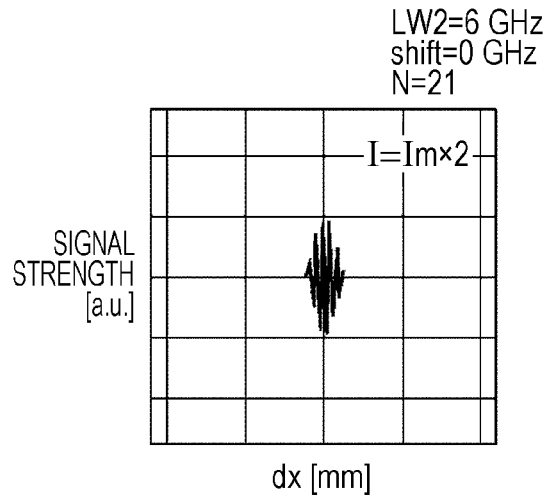
Figure 7D:
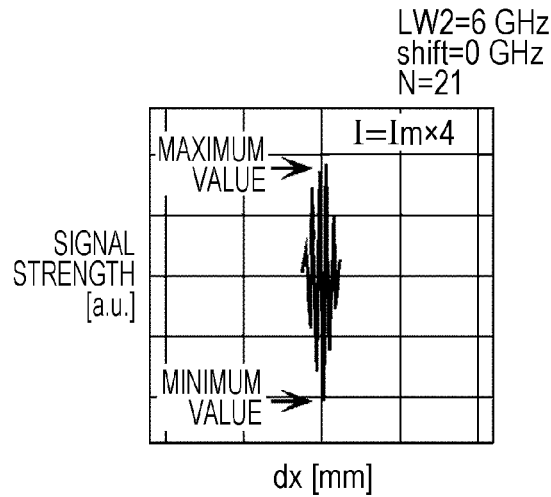

In FIGS. 7A through 7D, the horizontal axis indicates the optical path difference dx in the interferometer 10, and the vertical axis indicates the strength of a signal output from the interferometer 10. For the first interference fringes among the interference fringes appearing in each interferogram, dx1 in the position (½×dx1) of the first movable mirror 11 is set to be 50 mm, and dx2 in the position (½×dx2) of the second movable mirror 13 is varied between −1 mm, −0.9 mm, . . . , and 1 mm so that the number N of measurement portions can be 21. Then, interferograms are generated. In the interferograms shown in FIGS. 7A through 7D, signal components other than those corresponding to the first interference fringes are interpolated with zero, FIGS. 7A through 7D illustrate examples of the calculation results of interferograms when the intensity Im of scattered light due to molecules in the atmosphere is set to be constant and the intensity I of scattered light due to aerosols is varied between the values which are zero, one, two, and four times as high as the intensity Im, FIG. 7A shows that, when the signal of scattered light due to aerosols is zero, the signal strength of the interferogram is almost zero. It is thus seen from FIG. 7A that almost all scattered light components resulting from molecules in the atmosphere are removed by the configuration of an aspect of the disclosure. FIGS. 7B through 7D show that, as the intensity of scattered light due to aerosols is increased, the signal strength of the interferogram becomes higher.

The drive amount of the second movable mirror 13 is set to be greater than ¼ of the center wavelength λ of multi-laser light and is smaller than ½ of the interference fringe interval Δx.

Figure 8:
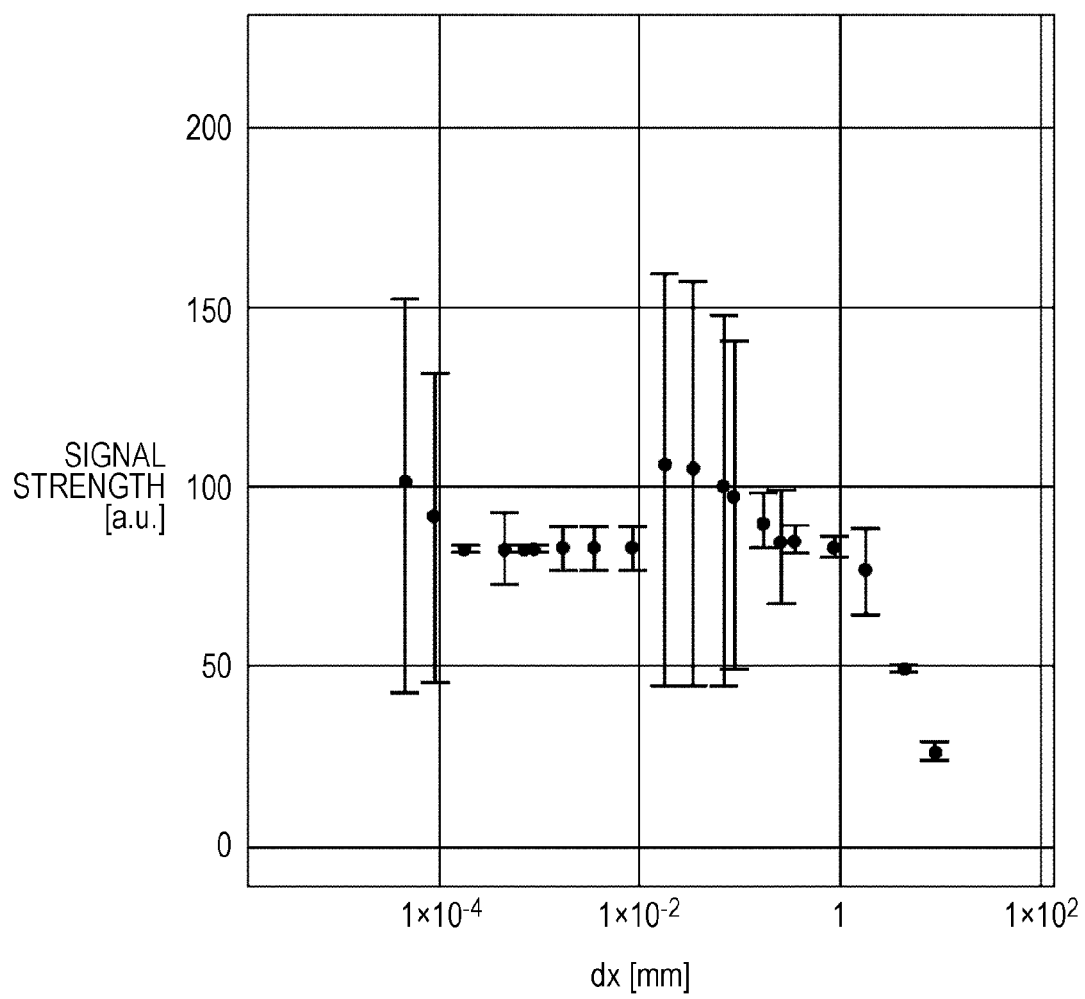
FIG. 8 is a graph illustrating an example of the dependency of the signal strength on the drive amount of a second movable mirror.

FIG. 8 is a graph illustrating the dependency of the signal strength on the drive amount of the second movable mirror 13 according to the embodiment. In FIG. 8, the horizontal axis indicates the drive amount, while the vertical axis indicates the signal strength.

FIG. 8 shows the calculation results obtained on the conditions that the center value of the multiple wavelength spectra of multi-laser light is 400 nm, the mode interval LW2 is 3 GHz, and the number N of measurement portions is 11. FIG. 8 also shows the calculation results regarding the dependency of variations in the signal strength on the drive amount when the center value λ is shifted between 0 GHz, 10 GHz, and 20 GHz.

As shown in FIG. 8, when the drive amount is $10^{-4}$ mm (=100 nm) or smaller, which is equivalent to ¼ of the wavelength k or smaller, the signal strength varies sharply. This is because it is not possible to obtain information concerning slight variations in the center value when the drive amount is ¼ of the wavelength k or smaller.

As shown in FIG. 8, when the drive amount is 50 mm or greater, which is equivalent to ½ of the fringe interval Δx or greater, the signal strength drops. This is because information concerning the interference fringes is lost when the drive amount reaches around ½ of the fringe interval Δx. Accordingly, it is appropriate that the drive amount of the second movable mirror 13 be set to be greater than ¼ of the center wavelength λ of multi-laser light and smaller than ½ of the interference fringe interval Δx. Then, it is possible to reduce variations in the signal strength caused by shifting of the center value λ and also to obtain the high signal strength.

The first interference fringes are very little influenced by scattered light resulting from molecules in the atmosphere compared with scattered light resulting from aerosols. When the intensity of scattered light resulting from aerosols becomes higher, the first interference fringes monotonically increase. Measuring the first interference fringes thus makes it possible to detect the intensity of scattered light due to aerosols.

As a result of sweeping the second movable mirror 13 in the interferometer 10, signal components in the vicinity of the first interference fringes corresponding to the wavelength interval can be detected. Hence, only Mie scattered light components can be obtained, while Rayleigh scattered light components are removed.

The magnitude of a first interference fringe can be expressed by the difference between the maximum value and the minimum value of an interferogram signal.

An interferogram in which signal components other than those corresponding to the first interference fringes are interpolated with zero may be used. This interferogram is subjected to Fourier transform, thereby generating waveform spectrum data. The magnitude of a first interference fringe is expressed by the maximum value of this waveform spectrum data.

As a result, the strength of a received signal can be uniquely determined.

The interferograms illustrated in FIGS. 9A through 13L are calculated by setting the ratio of the backscattering coefficient concerning the scattering from molecules in the atmosphere to that from aerosols to be 1:1.

Figure 9A:
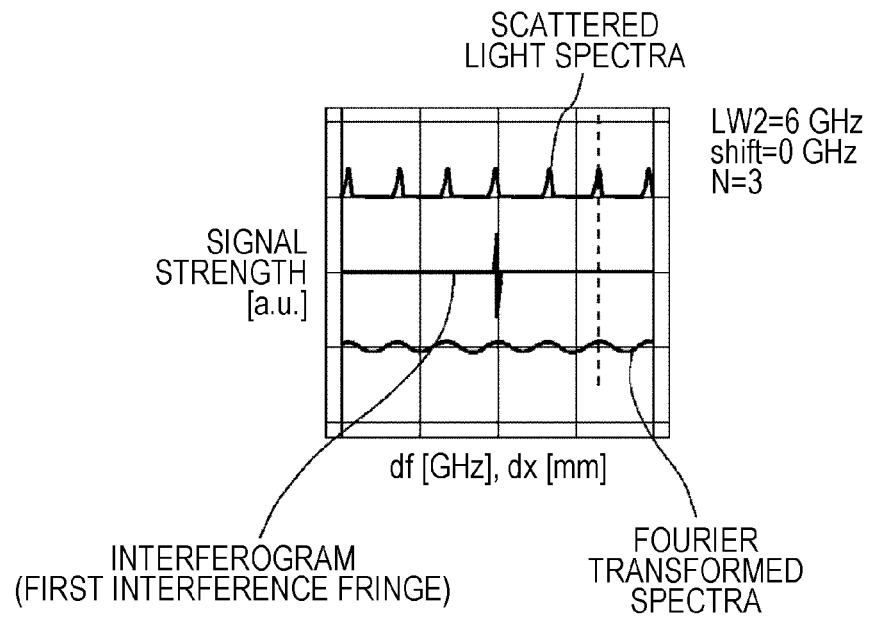
FIGS. 9A through 9C are graphs illustrating examples of the calculation results regarding the dependency of interferograms generated by the measurement apparatus of the embodiment on the amount of shift in the wavelength spectra of multi-laser light.
Figure 9B:
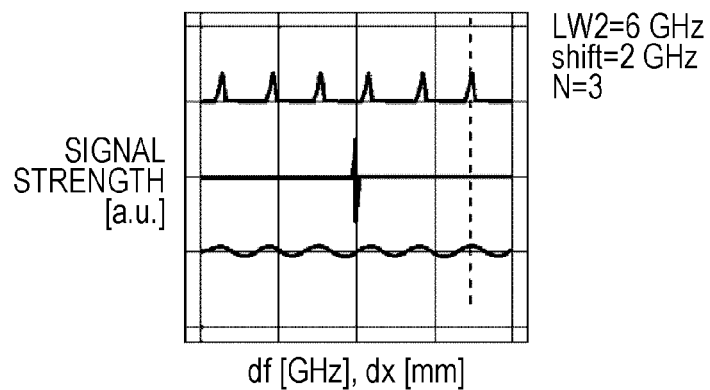
Figure 9C:
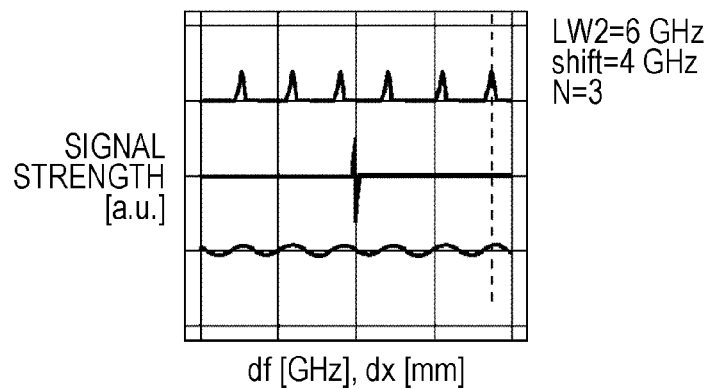
Figure 10A:
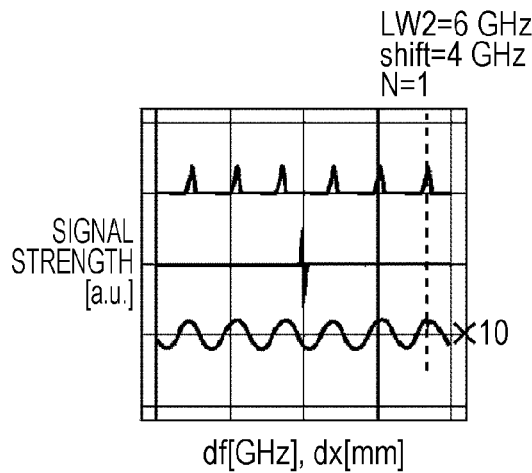
FIGS. 10A through 10E are graphs illustrating examples of the calculation results regarding the dependency of interferograms generated by the measurement apparatus of the embodiment on the number of measurement portions.
Figure 10B:
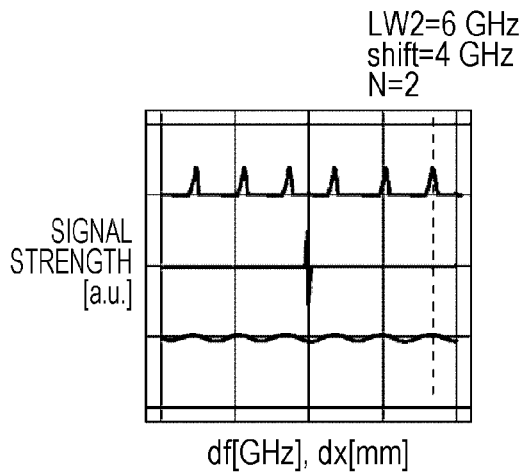
Figure 10C:
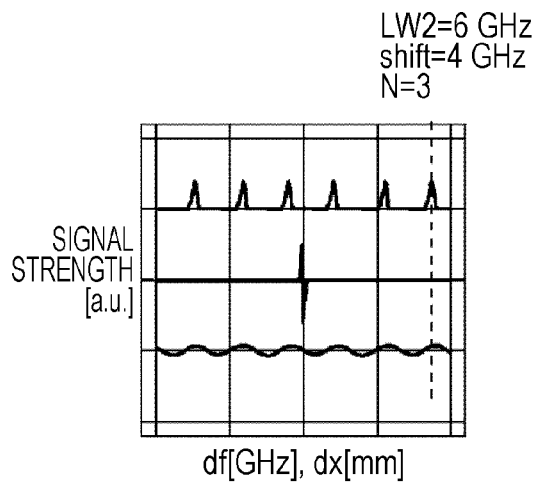
Figure 10D:
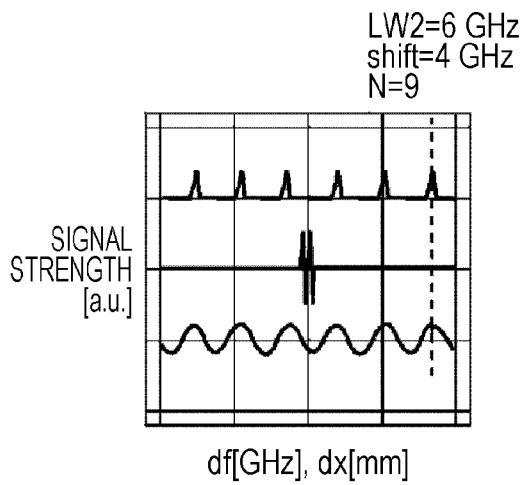
Figure 10E:
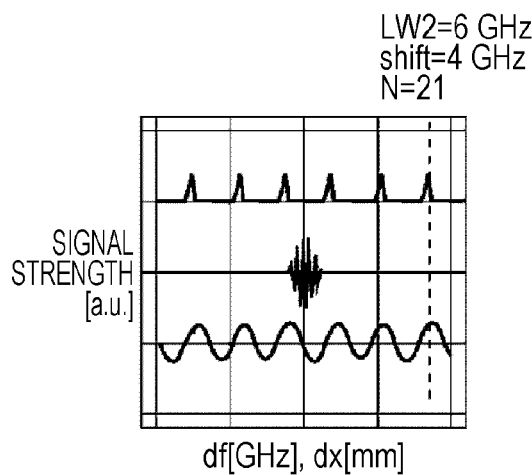
Figure 11A:
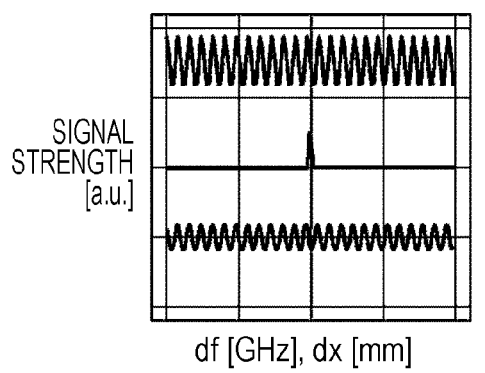
FIGS. 11A through 11F are graphs illustrating examples of the calculation results regarding the dependency of interferograms generated by the measurement apparatus of the embodiment on the mode interval LW2 of multi-layer light emitted from a multi-laser light source.
Figure 11B:
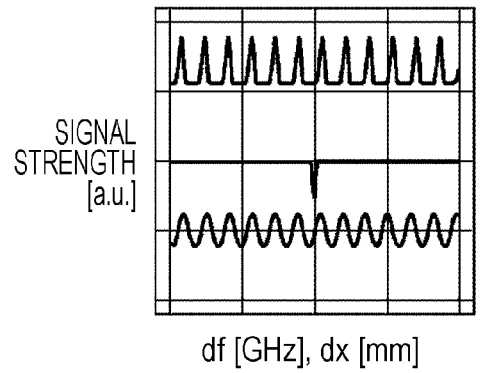
Figure 11C:
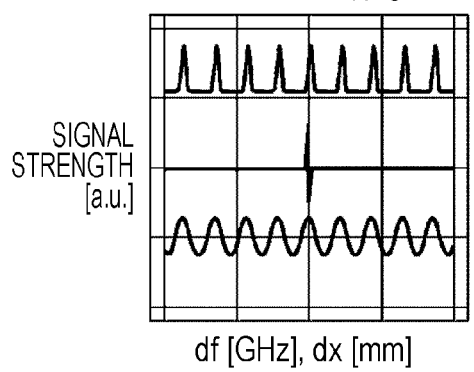
Figure 11D:
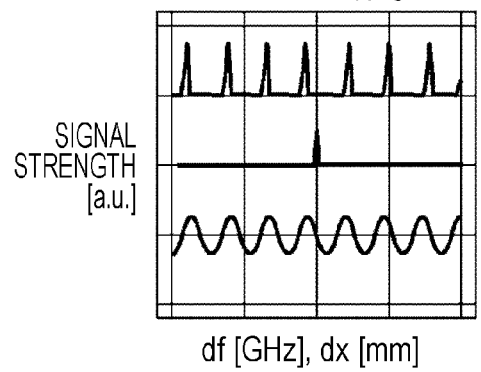
Figure 11E:
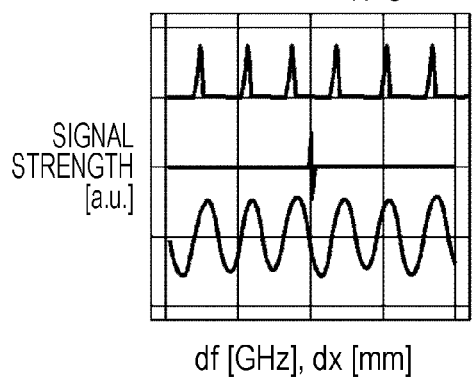
Figure 11F:
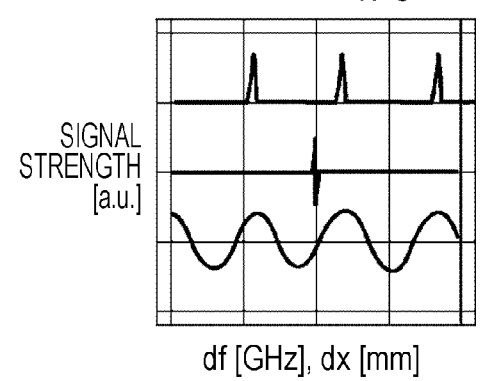

FIGS. 9A through 9C are graphs illustrating examples of the calculation results regarding the dependency of interferograms generated by the measurement apparatus 100 on the amount of shift in the wavelength spectra of multi-laser light. FIGS. 9A, 9B, and 9C illustrate the individual results obtained by shifting the center value λ (=400 nm) of the multiple wavelength spectra by the amount of wavelength corresponding to 0 GHz, 2 GHz, and 4 GHz, respectively.

In each of the graphs in FIGS. 9A through 9C, the top section represents scattered light spectra; the intermediate section represents an interferogram; and the bottom section represents spectra generated by conducting Fourier transform on the interferogram in the intermediate section. Regarding the scattered light spectra and the Fourier transformed spectra, the horizontal axis indicates the frequency difference df, while the vertical axis indicates the signal strength. The frequency difference df corresponds to the wavelength spectrum difference dλ. Regarding the interferogram, the horizontal axis indicates the optical path difference dx in the interferometer 10, while the vertical axis indicates the signal strength. The above-described explanation for FIGS. 9A through 9C are also applied to FIGS. 10A through 11F.

The distance dx2 (drive amount of the second movable mirror 13) is varied between −0.1 mm, 0 mm, and 0.1 mm so that the number N of measurement portions is three.

Interferograms are generated in accordance with the individual amounts of shift in the wavelength spectra of multi-laser light. The signal strength of the Fourier transformed spectra is uniform regardless of the amount of shift, and the signal pattern is varied in response to the amount of shift.

This shows that, in the embodiment, even with a shift in the wavelength spectra of multi-laser light, a signal can be received without the need to synchronize the multi-laser light source 1 and the interferometer 10 with each other.

FIGS. 10A through 10E are graphs illustrating examples of the calculation results regarding the dependency of interferograms formed from multi-laser scattered light spectra generated in the interferometer 10 on the number of measurement portions. FIGS. 10A through 10E illustrate the individual results obtained by changing the number N of measurement portions to 1, 2, 3, 9, and 21, respectively. Regarding the Fourier transformed spectra in FIG. 10A, the scale factor of the vertical axis is ten times larger than that of the vertical axis of each of FIGS. 10B through 10E. In FIGS. 10A through 10E, the amount of shift in the center value λ (=400 nm) of the multiple wavelength spectra is fixed at 4 GHz.

As shown in FIGS. 10A through 10E, as the number N of measurement portions is increased, the signal strength of the Fourier transformed spectra is intensified.

FIGS. 11A through 11F are graphs illustrating examples of the calculation results regarding the dependency of interferograms generated by the measurement apparatus 100 on the mode interval LW2 of multi-layer light emitted from the multi-laser light source 1. FIGS. 11A through 11F illustrate the individual results obtained by changing the mode interval LW2 of multi-laser light emitted from the multi-laser light source 1 to 1.5 GHz, 3 GHz, 4 GHz, 5 GHz, 6 GHz, and 12 GHz, respectively.

As shown in the top section of each of the graphs in FIGS. 11A through 11F, when the mode interval LW2, that is, the spectrum interval MW2 of scattered light, approaches the full width at half maximum RW (about 3.4 to 3.9 GHz) of Rayleigh scattered light resulting from molecules in the atmosphere, the intensity of the wavelength spectra of Rayleigh scattered light becomes almost flat. Rayleigh scattered light components thus concentrate on the vicinity of the 0th interference fringes, while only Mie scattered light components concentrate on the first interference fringes. In this manner, one aspect of the disclosure provides a technique of extracting an aerosol signal based on the difference between the full width at half maximum of Rayleigh scattered light components and that of Mie scattered light components.

That is, the multi-laser light source 1 emits light having multiple peaks separated from each other at equal frequency intervals, each of which is smaller than the full width at half maximum of the peaks of the frequency spectra of Rayleigh scattered light components. With this configuration, in interference fringes formed from scattered light generated as a result of light emitted from the multi-laser light source 1 being scattered by a scatterer, the intensity of Mie scattered light components becomes higher than that of Rayleigh scattered light components. Hence, Mie scattered light components can be enhanced, while Rayleigh scattered light components are removed. As a result, only Mie scattered light components can be detected with high precision.

Figure 12:
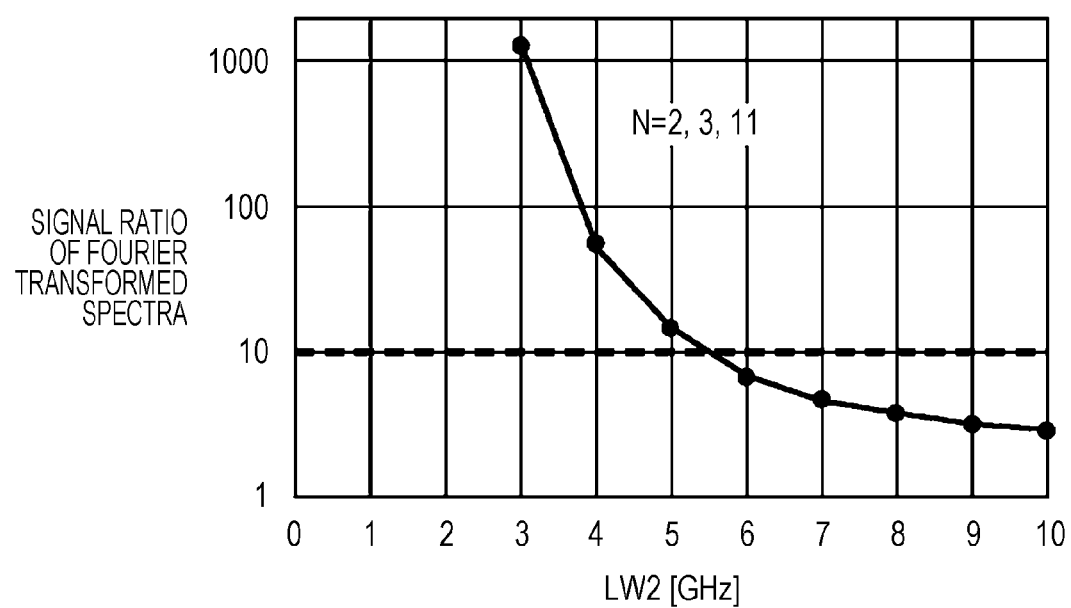
FIG. 12 is a graph illustrating an example of the calculation results regarding the dependency of the signal ratio of Fourier transformed spectra on the mode interval LW2 of multi-layer light emitted from the multi-laser light source.
Figure 13:
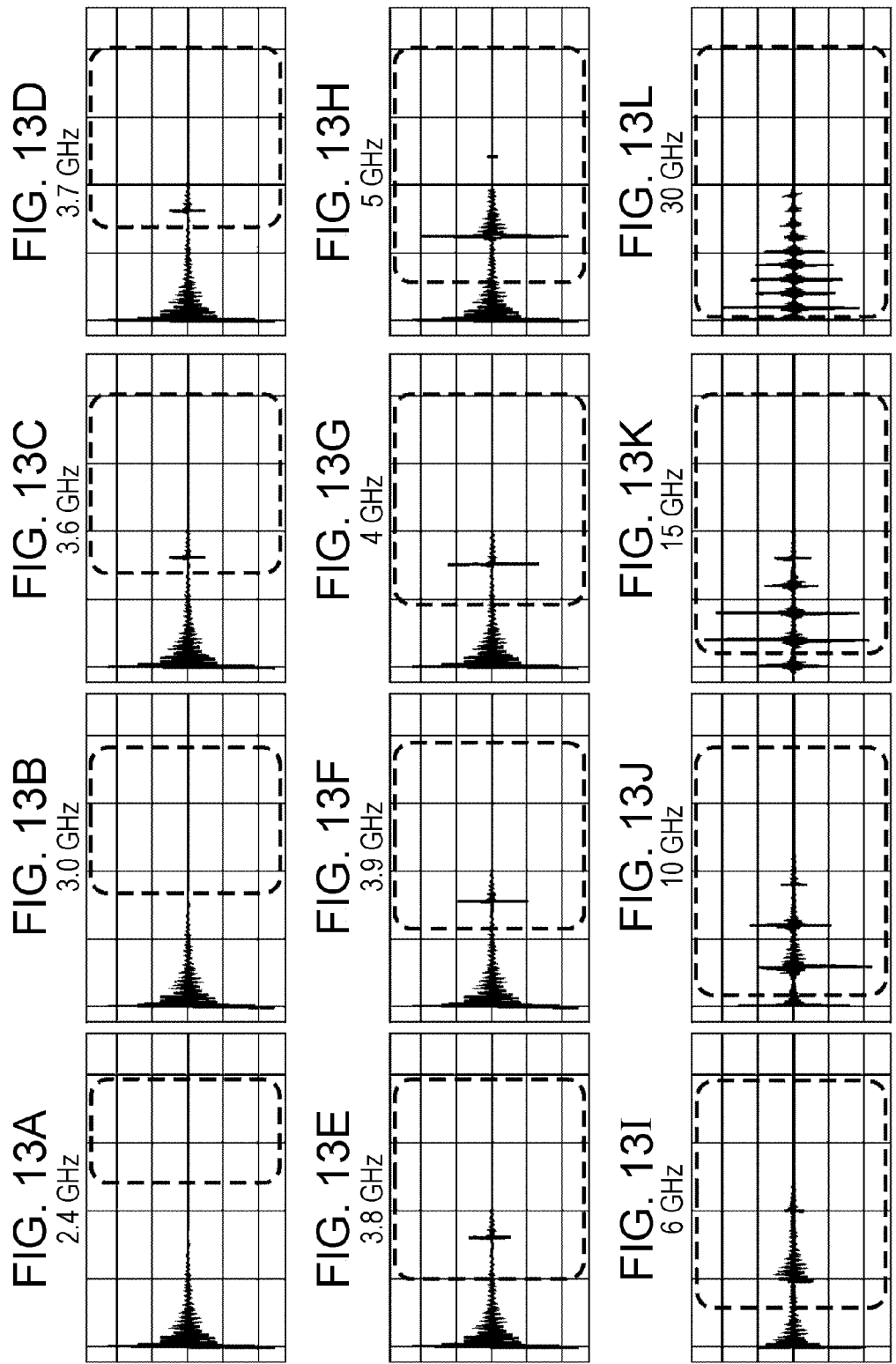
FIGS. 13A through 13L are graphs illustrating examples of the calculation results regarding the dependency of the signal strength on the frequency interval of interference fringes generated with a Michelson interferometer.

FIG. 12 is a graph illustrating an example of the calculation results regarding the dependency of the signal ratio of Fourier transformed spectra on the mode interval LW2 of multi-layer light emitted from the multi-laser light source 1.

In FIG. 12, the horizontal axis indicates the mode interval LW2, while the vertical axis indicates the signal ratio of Fourier transformed spectra. The signal ratio represents the ratio of the signal strength when the intensity I of scattered light due to aerosols is six times as high as the intensity Im of scattered light due to molecules in the atmosphere to that when the intensity I is 0. The signal ratio exceeding 1000 is not shown in FIG. 12. FIG. 12 also illustrates the dependency of the signal ratio on the number N of measurement portions which is changed between 2, 3, and 11. The signal ratio has no dependency on the number N of measurement portions, while it is decreased as the mode interval LW2 is increased.

Typically, a scattered signal generated due to molecules in the atmosphere can be ignored if at least one significant figure is provided and a signal ratio is 10 or higher.

FIG. 12 shows that the scattered signal due to molecules in the atmosphere can be removed when the mode interval LW2 is 5 GHz or lower.

FIGS. 13A through 13L are graphs illustrating the dependency of the signal strength on the frequency interval of interference fringes generated with a Michelson interferometer when scattering only due to molecules in the atmosphere is taken into account (scattering due to aerosols is disregarded). In FIGS. 13A through 13L the horizontal axis indicates the distance dx2 (drive amount of the second movable mirror 13), while the vertical axis indicates the signal strength. FIGS. 13A through 13L show the calculation results of interferograms when the frequency interval LW2 of emitted light is 2.4 GHz, 3.0 GHz, 3.6 GHz, 3.7 GHz, 3.8 GHz, 3.9 GHz, 4 GHz, 5 GHz, 6 GHz, 10 GHz, 15 GHz, and 30 GHz, respectively.

As shown in FIGS. 13A through 13L, as the mode interval LW2 (that is, the frequency interval LW2) increases, more interference fringes are generated and the signal strength of the interference fringes becomes intensified. For example, when the frequency interval LW2 is 2.4 GHz, substantially only the 0th interference fringes appear in the graph in FIG. 13A, and the first or higher-order interference fringes are not generated. When the frequency interval LW2 is 3.0 to 4 GHz, the 0th and first interference fringes appear in the graphs in FIGS. 13B through 13G, and the second or higher-order interference fringes are not generated. When the frequency interval LW2 is 5 GHz, as well as the 0th and first interference fringes, the second interference fringes appear in the graph in FIG. 13H. In each of FIGS. 13A through 13L the range in which the first or higher-order interference fringes appear in the graph is defined by the broken lines.

The fact that the second or higher-order interference fringes appear in the graphs when only atmosphere scattering is taken into account means that interference is occurring only in Rayleigh scattered light. That is, if Rayleigh scattered light enters the interferometer 10, it passes through the interferometer 10. When the frequency interval LW2 is 3.9 GHz or lower, the first interference fringes are attenuated, thereby making it less likely to cause Rayleigh scattered light to pass through the interferometer 10.

The magnitude of the first interference fringes when the frequency interval LW2 is 3.9 MHz is 50% or lower of that when the frequency interval LW2 is 5 GHz. The attenuated first interference fringes make it less likely to cause Rayleigh scattered light to pass through the interferometer 10.

In this manner, by setting the frequency interval LW2 to be 3.9 GHz or lower, Rayleigh scattered light components can be efficiently removed from scattered light.

As described above, when the frequency interval of light emitted from the multi-laser light source 1 is 5 GHz or lower, Rayleigh scattered light components generated by the scattering from molecules in the atmosphere can be removed effectively, thereby detecting aerosols from Mie scattered light components with high precision. When the frequency interval of light emitted from the multi-laser light source 1 is 3.9 GHz, Mie scattered light components can be detected with even higher precision, thereby further enhancing the detection precision of aerosols.

[3. Configuration]

Details of the elements forming the measurement apparatus 100 will be described below with reference to FIG. 1.

[3-1, Multi-Laser Light Source]

The multi-laser light source 1 is an example of a light source that emits laser light exhibiting frequency spectra having multiple peaks separated from each other at equal frequency intervals to a scatterer in the atmosphere. In other words, the multi-laser light source 1 is an example of a light source that emits laser light having multiple oscillation frequencies of different wavelengths separated from each other at equal wavelength intervals to a scatterer.

The frequency interval is smaller than the full width at half maximum of the peak of frequency spectra of Rayleigh scattered light resulting from molecules in the atmosphere. More specifically, as shown in FIGS. 3A through 4B, the frequency interval LW2 is smaller than the full width at half maximum RW of the peak of Rayleigh scattered light components resulting from molecules in the atmosphere.

In the measurement apparatus 100 in the embodiment, the multi-laser light source 1 is realized by a multimode laser, for example. Alternatively, a multimode interference filter, such as an etalon, may be placed in front of a laser light source. In either configuration, sharp waveforms having a narrow full width at half maximum and periodic spectrum peaks can be obtained. Multiple lasers that are designed to emit light waveforms having periodic spectrum peaks may alternatively be used.

[3-2. Interferometer]

The interferometer 10 produces interference in scattered light generated as a result of laser light emitted from the multi-laser light source 1 being scattered by a scatterer. More specifically, the interferometer 10 splits scattered light into first scattered light and second scattered light whose optical paths are different from each other, varies the optical path difference between the optical path of the first scattered light and that of the second scattered light, and causes the first scattered light and the second scattered light to interfere with each other, thereby generating interference light. As a result, the interferometer 10 forms an interferogram.

In the embodiment, the interferometer 10 is a Michelson interferometer, as shown in FIG. 1. However, the interferometer 10 may be a different type of interferometer, such as a Mach-Zehnder interferometer or a Fabry-Perot interferometer.

The interferometer 10 includes the first movable mirror 11, the semitransparent mirror 12, and the second movable mirror 13.

The initial distance between the second movable mirror 13 and the semitransparent mirror 12 is set to be $\frac{1}{2} \times L$. Half of the distance $dx1$ ($=\Delta x$) corresponding to the interference fringe interval $\Delta x$ is added to the above-described initial distance, resulting in the distance ($\frac{1}{2} \times L + \frac{1}{2} \times dx1$). The distance between the first movable mirror 11 and the semitransparent mirror 12 is set to be this value ($\frac{1}{2} \times L + \frac{1}{2} \times dx1$) by moving the first movable mirror 11. While sweeping the second movable mirror 13 in a range of $\frac{1}{2} \times L \pm dx2$, measurements are conducted. The optical path difference between the optical path of the first scattered light reflected by the first movable mirror 11 and that of the second scattered light reflected by the second movable mirror 13 is calculated as follows.

$$\text{Optical path difference} = 2 \times (\tfrac{1}{2} \times L + \tfrac{1}{2} \times dx1) - 2 \times (\tfrac{1}{2} \times L \pm \tfrac{1}{2} \times dx2) = dx1 \pm dx2$$

With the use of the two movable mirrors, the movable range is distributed over that by the first movable mirror 11 having a long movable length and the second movable mirror 13 having a short movable length. During measurements, the first movable mirror 11 is fixed, while the second movable mirror 13 is moved. This configuration can generate multi-laser light spectra with high precision with the use of the interferometer 10 small in size.

In the embodiment, the two movable mirrors which are movable by different distances are used. Alternatively, a combination of a movable mirror and a fixed mirror may be used. Additionally, during measurements, the second movable mirror 13 may be fixed, while the first movable mirror 11 may be moved.

[3-3. Light Receiver]

The light receiver 6 receives Mie scattered light components included in interference scattered light. More specifically, the light receiver 6 receives interference light output from the interferometer 10 and outputs a signal representing the intensity of the interference light. That is, the light receiver 6 converts the interference light generated in the interferometer 10 into a signal.

As the light receiver 6, a photomultiplier tube (PMT), for example, is used. Alternatively, the light receiver 6 may include a PMT and a photon counter or may include an avalanche photodiode (APD).

[3-4, Signal Processor]

The signal processor 7 processes the signal generated by the light receiver 6. More specifically, the signal processor 7 detects the quantity of Mie scattered light from the signal output from the light receiver 6. For example, the signal processor 7 detects signal components corresponding to Mie scattered light included in the scattered light from the signal representing the interferogram output from the light receiver 6.

The elements forming the signal processor 7 may be implemented by a computer or one or multiple electronic circuits. One or multiple electronic circuits may each be a general-purpose circuit or a dedicated circuit.

One or multiple electronic circuits may include a semiconductor device, an IC, or an LSI, for example. An LSI or an IC may be integrated into one chip or be distributed over multiple chips. An LSI or an IC may be called a system LSI, a VLSI, or an ULSI, depending on the integration degree. Instead of an LSI or an IC, an FPGA may be used for the same purpose,

[3-5. Condenser]

The condenser 50 is an optical element that condenses scattered light returning from a scatterer, which is the subject 2 to be detected. The condenser 50 includes at least one condenser lens or at least one reflector mirror or a combination thereof. The condenser 50 may include a lens group constituted by a condenser lens and a collimater lens. Light condensed by the condenser lens is converted into parallel light by the collimater lens and is output. Scattered light condensed by the condenser 50 enters the mirror 3. The condenser 50 may include a pinhole.

The condenser 50 is disposed on the optical path between a scatterer and the interferometer 10. In the example in FIG.

1, the condenser 50 is disposed between the subject 2, which is a scatterer, and the mirror 3.

Figure 14:
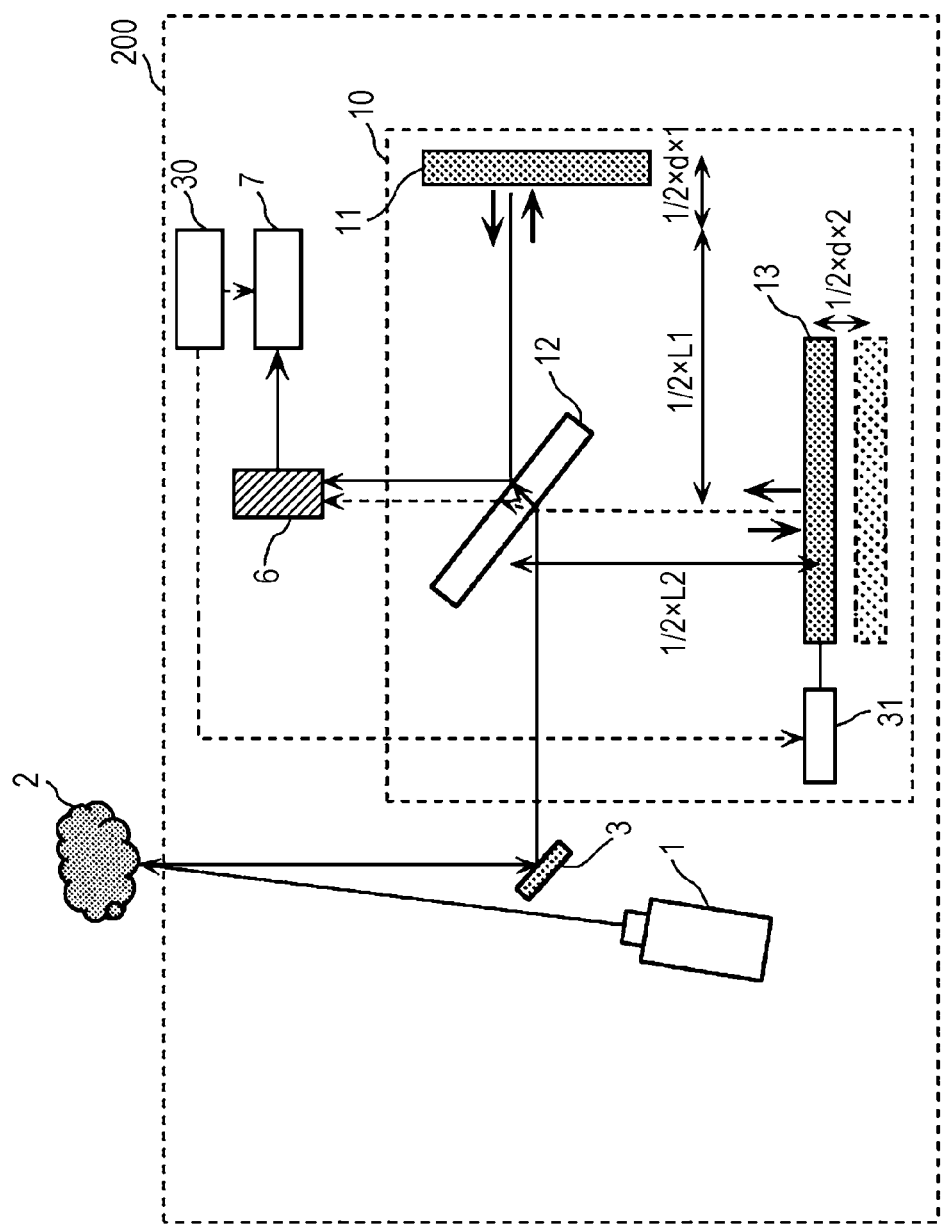
FIG. 14 is a schematic view illustrating the configuration of a measurement apparatus according to a modified example of the embodiment.

If the intensity of scattered light is high, the provision of the condenser 50 may be omitted. That is, as shown in FIG. 14, a measurement apparatus 200, which is a modified example of the measurement apparatus 100, does not include the condenser 50, The measurement apparatus 200 is the same as the measurement apparatus 100, except for the omission of the condenser 50.

[4. Application Examples of Measurement Apparatus]

Figure 15A:
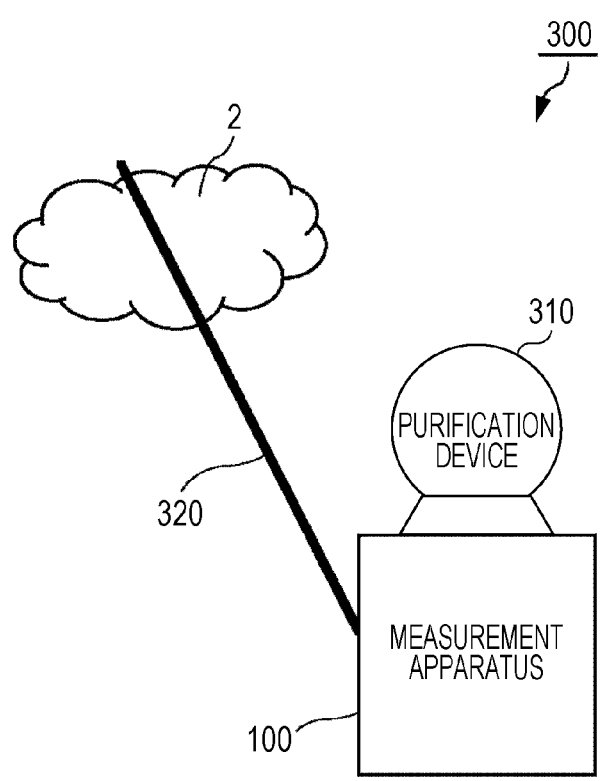
FIGS. 15A and 15B are schematic views illustrating a purification system including the measurement apparatus of the embodiment or the modified example.
Figure 15B:
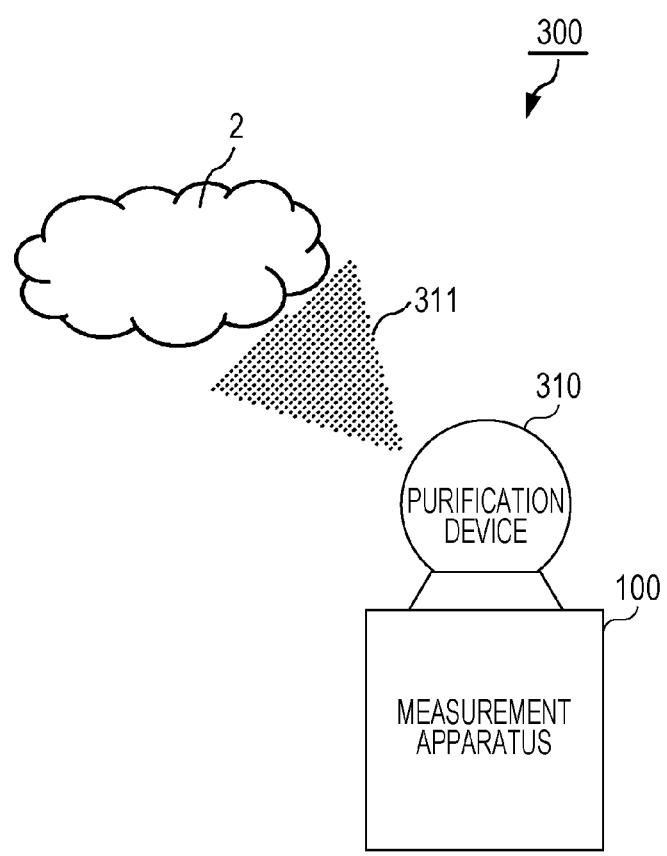

An application example of the measurement apparatus 100 according to the embodiment will be described below with reference to FIGS. 15A and 15B FIGS. 15A and 15B illustrate a purification system 300 including the measurement apparatus 100 of the embodiment.

As shown in FIGS. 15A and 15B, the purification system 300 includes the measurement apparatus 100 and a purification device 310. The purification system 300 may include the measurement apparatus 200 shown in FIG. 14, instead of the measurement apparatus 100.

The purification device 310 is a device that cleans aerosols. In the embodiment, cleaning aerosols means reducing aerosols detected in a detection area. This can lessen health damage caused by aerosols. Cleaning aerosols also means making virus contained in aerosols harmless and/or simply exhausting aerosols from a subject space.

The purification device 310 is a spray device that sprays a chemical solution 311 which makes aerosols harmless, for example. The chemical solution 311 is sodium hypochlorite water or ozone water. The chemical solution 311 may alternatively be an alcohol solution. The chemical solution 311 serves to eliminate bacteria or virus. The purification device 310 atomizes the chemical solution 311 and sprays it. The purification device 310 may spray the atomized chemical solution 311 in a vertex ring shape.

The purification device 310 may be an airflow generator. In this case, airflow is blown out of the purification device 310 and/or is sucked into the purification device 310.

The purification device 310 cleans aerosols based on the measurement results generated by the measurement apparatus 100. More specifically, as shown in FIG. 15A, the measurement apparatus 100 emits laser light 320 toward a scatterer (subject 2) and receives light scattered by the scatterer, thereby detecting aerosols contained in the scatterer. For example, by scanning the path of the laser light 320 in a space in accordance with the emitting direction, the measurement apparatus 100 is able to detect the presence or the absence of aerosols and/or create the distribution of the aerosol density. As shown in FIG. 15B, the purification device 310 sprays the chemical solution 311 toward the area where aerosols and/or aerosols having a density exceeding a predetermined threshold are present, based on the distribution of the aerosol density created by the measurement apparatus 100.

As described above, the purification system 300 is able to spray the chemical solution 311 toward aerosols by using the measurement results generated by the measurement apparatus 100. This can effectively utilize the chemical solution 311 to make aerosols harmless, thereby making it possible to clean aerosols efficiently.

If the purification device 310 is an airflow generator, it can clean aerosols in the following manner. The purification device 310 generates airflow in a direction in which it is blown toward aerosols so as to squeeze aerosols out of a detection area. Alternatively, the purification device 310 may generate airflow in a direction in which it sucks in aerosols. The purification system 300 is able to locate aerosols from the measurement results generated by the measurement apparatus 100 so as to generate airflow in a suitable direction based on the positions of aerosols. This makes it less likely to diffuse aerosols by the generated airflow, thereby achieving efficient cleaning of aerosols.

Other Embodiments

The measurement apparatus and method according to one or plural aspects of the disclosure have been discussed. However, the present disclosure is not restricted thereto. Modified examples obtained by making various modifications to the above-described embodiment by those skilled in the art and other aspects implemented by combining certain elements in different embodiments without departing from the scope and spirit of the disclosure are also encompassed in one or plural aspects of the disclosure.

Various changes, replacements, addition, and omission may be made to the above-described embodiment within the spirit and scope of the disclosure defined by the following claims or their equivalents.

The present disclosure is applicable to a measurement apparatus and method for detecting the distribution of aerosols in the atmosphere, and more specifically, to meteorological observation outdoors and measurements of toxic particles indoors, for example.

What is claimed is:

1. A measurement apparatus comprising:
a light source that emits laser light to a scatterer in an atmosphere, the laser light having a plurality of oscillation frequencies separated from each other at equal frequency intervals;
an interferometer that produces interference in scattered light, the scattered light being generated as a result of the laser light being scattered by the scatterer;
a light receiver that receives Mie scattered light included in the scattered light subjected to the interference produced by the interferometer and generates a signal; and
a signal processor that detects a quantity of the Mie scattered light based on the signal,
wherein each of the equal frequency intervals is smaller than a full width at half maximum of a peak of a frequency spectrum of Rayleigh scattered light, the Rayleigh scattered light being generated as a result of the laser light being scattered by molecules forming the atmosphere.

2. The measurement apparatus according to claim 1, wherein the interferometer splits the scattered light into first scattered light and second scattered light, an optical path of the second scattered light being different from an optical path of the first scattered light, varies an optical path difference between the optical path of the first scattered light and the optical path of the second scattered light, and causes the first scattered light and the second scattered light to interfere with each other so as to generate interference light.

3. The measurement apparatus according to claim 1, wherein each of the equal frequency intervals is equal to or lower than 3.9 GHz.

4. A measurement apparatus comprising:
a light source that emits laser light to a scatterer in an atmosphere, the laser light having a plurality of oscillation frequencies separated from each other at equal frequency intervals;
an interferometer that generates an interferogram by splitting scattered light, the scattered light being generated as a result of the laser light being scattered by the scatterer, into first scattered light and second scattered light and by causing the first scattered light and the second scattered light to interfere with each other, an optical path of the second scattered light being different from an optical path of the first scattered light;

a light receiver that converts the interferogram into a signal;

a signal processor that processes the signal; and a controller that causes the interferometer to sweep an optical path difference between the optical path of the first scattered light and the optical path of the second scattered light, wherein the signal processor acquires a signal component corresponding to Mie scattered light included in the scattered light, by extracting a signal component including a first interference fringe from a signal component of the interferogram, the first interference fringe being generated when the optical path difference is equal to a wavelength interval corresponding to each of the equal frequency intervals.

5. The measurement apparatus according to claim 4, wherein:

the interferogram includes a plurality of interference fringes; and the controller causes the interferometer to sweep the optical path difference in a range which is greater than ¼ of a center wavelength of the laser light and which is smaller than ½ of an interval between the plurality of interference fringes.

6. The measurement apparatus according to claim 4, wherein the signal processor executes Fourier transform on the signal component including the first interference fringe.

7. The measurement apparatus according to claim 4, wherein the interferometer includes a first movable mirror and a second movable mirror.

8. The measurement apparatus according to claim 4, wherein each of the equal frequency intervals is equal to or lower than 5 GHz.

9. The measurement apparatus according to claim 4, wherein each of the equal frequency intervals is equal to or lower than 3.9 GHz.

10. The measurement apparatus according to claim 1, further comprising:

a condenser that is disposed on an optical path between the scatterer and the interferometer and condenses the scattered light.

11. A measurement method comprising:

emitting laser light to a scatterer in an atmosphere, the laser light having a plurality of oscillation frequencies separated from each other at equal frequency intervals;

producing interference in scattered light, the scattered light being generated as a result of the laser light being scattered by the scatterer;

receiving Mie scattered light included in the scattered light subjected to the interference and generating a signal; and detecting a quantity of the Mie scattered light from the signal, wherein each of the equal frequency intervals is smaller than a full width at half maximum of a peak of a frequency spectrum of Rayleigh scattered light, the Rayleigh scattered light being generated as a result of the laser light being scattered by molecules forming the atmosphere.

12. A measurement method comprising:

emitting laser light to a scatterer in an atmosphere, the laser light having a plurality of oscillation frequencies separated from each other at equal frequency intervals;

generating an interferogram by splitting scattered light, the scattered light being generated as a result of the laser light being scattered by the scatterer, into first scattered light and second scattered light and by causing the first scattered light and the second scattered light to interfere with each other, an optical path of the second scattered light being different from an optical path of the first scattered light;

converting the interferogram into a signal;

processing the signal; and sweeping an optical path difference between the optical path of the first scattered light and the optical path of the second scattered light, wherein, in the processing of the signal, a signal component corresponding to Mie scattered light included in the scattered light are acquired by extracting a signal component including a first interference fringe from a signal component of the interferogram, the first interference fringe being generated when the optical path difference is equal to a wavelength interval corresponding to each of the equal frequency intervals.

* * * * *